(12) United States Patent
Arai

(10) Patent No.: US 10,366,015 B2
(45) Date of Patent: Jul. 30, 2019

(54) STORAGE MEDIUM STORING CACHE MISS ESTIMATION PROGRAM, CACHE MISS ESTIMATION METHOD, AND INFORMATION PROCESSING APPARATUS

(71) Applicant: FUJITSU LIMITED, Kawasaki-shi, Kanagawa (JP)

(72) Inventor: Masaki Arai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 83 days.

(21) Appl. No.: 15/498,666

(22) Filed: Apr. 27, 2017

(65) Prior Publication Data

US 2017/0357601 A1 Dec. 14, 2017

(30) Foreign Application Priority Data

Jun. 13, 2016 (JP) .................................. 2016-117149

(51) Int. Cl.
*G06F 12/12* (2016.01)
*G06F 12/08* (2016.01)
(Continued)

(52) U.S. Cl.
CPC ............ *G06F 12/128* (2013.01); *G06F 11/34* (2013.01); *G06F 12/0868* (2013.01); *G06F 2212/225* (2013.01)

(58) Field of Classification Search
None
See application file for complete search history.

(56) References Cited

U.S. PATENT DOCUMENTS 4,991,088 A * 2/1991 Kam ..................... G06F 8/4442
711/133
5,065,310 A * 11/1991 Stone .................. G06F 12/0842
710/267
(Continued)

FOREIGN PATENT DOCUMENTS

JP 8-241208 9/1996

OTHER PUBLICATIONS

Synthesizing Transformations for Locality Enhancement of Imperfectly-Nested Loop Nests by Ahmed; International Journal of Parallel Programming, vol. 29, No. 5, Oct. 2001 (Year: 2001).*
(Continued)

*Primary Examiner* — Reginald G Bragdon
*Assistant Examiner* — Paul M. Knight
(74) *Attorney, Agent, or Firm* — Staas & Halsey LLP

(57) ABSTRACT

A method for a cache miss estimation includes; generating a variable range of a possible value of loop variables relevant to a specific array; generating first expression of number of times indicating the number of times the specific position of a specific loop is executed; generating second expression of number of times indicating the number of times the data of the access target is stored in the cache; generating third expression of number of times indicating the number of times the data of the access target is removed from the cache; generating fourth expression of number of times, from a generated conflict miss cause common expression, indicating the number of times the data of the access target is stored in the cache; and estimating a number of cache miss based on the difference between the first and the second expressions and the difference between the third and the forth expressions.

20 Claims, 13 Drawing Sheets

(51) Int. Cl.
*G06F 11/34* (2006.01)
*G06F 12/128* (2016.01)
*G06F 12/0868* (2016.01)

(56) References Cited

U.S. PATENT DOCUMENTS

| | | | | |
|---|---|---|---|---|
| 5,452,457 | A * | 9/1995 | Alpert | G06F 8/443 |
| | | | | 714/E11.192 |
| 5,511,178 | A * | 4/1996 | Takeda | G06F 9/381 |
| | | | | 711/125 |
| 5,546,559 | A * | 8/1996 | Kyushima | G06F 12/127 |
| | | | | 711/133 |
| 5,689,712 | A * | 11/1997 | Heisch | G06F 8/4442 |
| | | | | 714/35 |
| 6,668,325 | B1 * | 12/2003 | Collberg | G06F 21/14 |
| | | | | 713/194 |
| 6,735,687 | B1 * | 5/2004 | Kok | G06F 9/3851 |
| | | | | 712/215 |
| 6,918,010 | B1 * | 7/2005 | Yeager | G06F 9/30047 |
| | | | | 711/137 |
| 2003/0065888 | A1 * | 4/2003 | Nishiyama | G06F 8/4442 |
| | | | | 711/137 |
| 2008/0155237 | A1 * | 6/2008 | Dobson | G06F 9/325 |
| | | | | 712/241 |
| 2008/0282232 | A1 * | 11/2008 | Cong | G06F 11/3404 |
| | | | | 717/127 |
| 2015/0277876 | A1 * | 10/2015 | Yamanaka | G06F 8/423 |
| | | | | 717/152 |
| 2015/0324292 | A1 * | 11/2015 | Krishnaiyer | G06F 12/0862 |
| | | | | 711/137 |

OTHER PUBLICATIONS

A Practical Automatic Polyhedral Parallelizer and Locality Optimizer by Bondhugula; ACM (Year: 2008).*
Cache Miss Equations: A Compiler Framework for Analyzing and Tuning Memory Behavior by Ghosh; ACM (Year: 1999).*
Lightweight Runtime Control Flow Analysis for Adaptive Loop Caching by Rawlins; ACM (Year: 2010).*
Siddhartha Chatterjee et al. 2001. "Exact analysis of the cache behavior of nested loops." in *Proceedings of the ACM SIGPLAN 2001 conference on Programming language design and implementation* (PLDI '01). ACM, New York, NY, USA, 286-297.

* cited by examiner

FIG. 2

```
131 {  for (i = 0; i < X; i++) {
         S1: A[i] = 0;
       }
       for (j = 0; j < Y; j++) {
         S2: B[j] = 0;
       }
       for (k = 0; k < Z; k++) {
         S3: C[k] = A[k];
       }
```

| TYPE OF DATA | VALUE |
|---|---|
| STARTING ADDRESS $\mu_A$ OF ARRAY A | 0 |
| NUMBER $\beta_A$ OF BYTES PER ARRAY ELEMENT OF ARRAY A | 8 |
| TOTAL NUMBER $\alpha_A$ OF ELEMENTS OF ARRAY A | 100 |
| STARTING ADDRESS $\mu_B$ OF ARRAY B | 800 |
| NUMBER $\beta_B$ OF BYTES PER ARRAY ELEMENT OF ARRAY B | 8 |
| TOTAL NUMBER $\alpha_B$ OF ELEMENTS OF ARRAY B | 100 |
| STARTING ADDRESS $\mu_C$ OF ARRAY C | 1600 |
| NUMBER $\beta_C$ OF BYTES PER ARRAY ELEMENT OF ARRAY C | 8 |
| TOTAL NUMBER $\alpha_C$ OF ELEMENTS OF ARRAY C | 100 |

| PROPERTY | VALUE |
|---|---|
| STATEMENT | S3 |
| SIDE | right |
| POSITION | 1 |

| TYPE OF DATA | VALUE |
|---|---|
| ASSOCIATIVITY A OF CACHE | 2 |
| BLOCK SIZE B OF CACHE | 32 |
| NUMBER S OF SETS OF CACHE | 4 |

| LOOP VARIABLE | LOWER LIMIT | UPPER LIMIT |
|---|---|---|
| i | 0 | X-1 |
| j | 0 | Y-1 |
| k | 0 | Z-1 |

FIG. 7

| POSITION NUMBER | STATEMENT | SIDE | POSITION | ARRAY | SUBSCRIPT EXPRESSION OF ARRAY | RELEVANT LOOP VARIABLE |
|---|---|---|---|---|---|---|
| P0 | S1 | left | 1 | A | i | i |
| P1 | S2 | left | 1 | B | j | j |
| P2 | S3 | right | 1 | A | k | k |
| P3 | S3 | left | 1 | C | k | k |

| TYPE OF MISS | EXPRESSION REPRESENTING NUMBER OF TIMES OF CACHE MISSES |
|---|---|
| INITIAL REFERENCE MISS | $M_{cold} = V_G - (V_{C1} + V_{C2} + V_{C3} + V_{C4} + V_{C5})$ |
| CONFLICT MISS | $M_{conflict} = V_{J4,1''} + V_{J4,2''} + V_{J4,3''} - (V_{Z4,1} + V_{Z4,2}) + V_{J5,1''} + V_{J5,2''} + V_{J5,3''} - (V_{Z5,1} + V_{Z5,2} + V_{Z5,3})$ |

137

SPECIFIC EXAMPLE OF
PARAMETER INFORMATION

| TYPE OF DATA | VALUE |
|---|---|
| PARAMETER VARIABLE X | 10 |
| PARAMETER VARIABLE Y | 10 |
| PARAMETER VARIABLE Z | 6 |

ESTIMATION RESULT OF
NUMBER OF TIMES OF CACHE MISSES

| TYPE OF MISS | NUMBER OF TIMES OF MISSES |
|---|---|
| INITIAL REFERENCE MISS | 0 |
| CONFLICT MISS | 1 |

STORAGE MEDIUM STORING CACHE MISS ESTIMATION PROGRAM, CACHE MISS ESTIMATION METHOD, AND INFORMATION PROCESSING APPARATUS

CROSS-REFERENCE TO RELATED APPLICATION

This application is based upon and claims the benefit of priority of the prior Japanese Patent Application No. 2016-117149, filed on Jun. 13, 2016, the entire contents of which are incorporated herein by reference.

FIELD

The embodiment discussed herein is related to a storage medium storing a cache miss estimation program, a cache miss estimation method, and an information processing apparatus.

BACKGROUND

In recent years, researches have been carried out for high-speed operation of a program (hereinafter, may be referred to as an application program) that operates in a large-scale parallel computer system (hereinafter, may be referred to as a high performance computing (HPC) system).

Specifically, a method of effectively using a cache of a central processing unit (CPU), for example, is studied as a method for high-speed operation of an application program in the HPC system. In this case, a researcher or the like (hereinafter, may be simply referred to as a researcher) of the HPC system, for example, causes the application program to operate in the HPC system and acquires profile data that includes the status of use of the cache by the application program in operation. The researcher, for example, interprets the acquired profile data to find a method for effectively using the cache. Japanese Laid-open Patent Publication No. 8-241208 is an example of the related art. Siddhartha Chatterjee, Erin Parker, Philip J. Hanlon, and Alvin R. Lebeck, "Exact analysis of the cache behavior of nested loops" In Cindy Norris and Jr. James B. Fenwick, editors, Programming Language Design and Implementation (PLD1-01), volume 36.5 of ACM SIGPLAN Notices, Pages 286-297, N.Y., Jun. 20-22, 2001, ACMPress is another example of the related art.

However, in the case of creating such profile data, the researcher may desire to use the HPC system (hereinafter, may be referred to as a real machine) for a long period of time. Thus, the researcher may not sufficiently create the profile data with use of the real machine depending on constraints of time or the like under which the real machine may be used.

Meanwhile, there exists a method of creating profile data by using a simulator of the HPC system. In this case, the researcher executes an application program in the simulator and collects information to be used for creation of the profile data. Accordingly, the researcher may acquire the profile data without using the HPC system for a long period of time.

However, the execution speed of the simulator may be significantly lower than the execution speed of the real machine. Thus, the researcher may not efficiently create profile data in the case of creating the profile data by using the simulator.

Therefore, according to an aspect, it is desired to provide a storage medium storing a cache miss estimation program, a cache miss estimation method, and an information processing apparatus that may efficiently acquire information related to a cache miss occurring during execution of a program.

SUMMARY

According to an aspect of the invention, a method for a cache miss estimation includes; generating a variable range of a possible value of loop variables relevant to a specific array; generating first expression of number of times indicating the number of times the specific position of a specific loop is executed; generating second expression of number of times indicating the number of times the data of the access target is stored in the cache; generating third expression of number of times indicating the number of times the data of the access target is removed from the cache; generating fourth expression of number of times, from a generated conflict miss cause common expression, indicating the number of times the data of the access target is stored in the cache; and estimating a number of cache miss based on the difference between the first and the second expressions and the difference between the third and the fourth expressions.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating program information;

FIG. 3 is a diagram illustrating data information;

FIG. 4 is a diagram illustrating positional information;

FIG. 5 is a diagram illustrating a specific example of cache information;

FIG. 6 is a diagram illustrating a specific example of loop information;

FIG. 7 is a diagram illustrating a specific example of array information;

FIG. 15 is a diagram illustrating the cache miss estimation process in the embodiment;

DESCRIPTION OF EMBODIMENT

[Configuration of Information Processing System]

Figure 1:
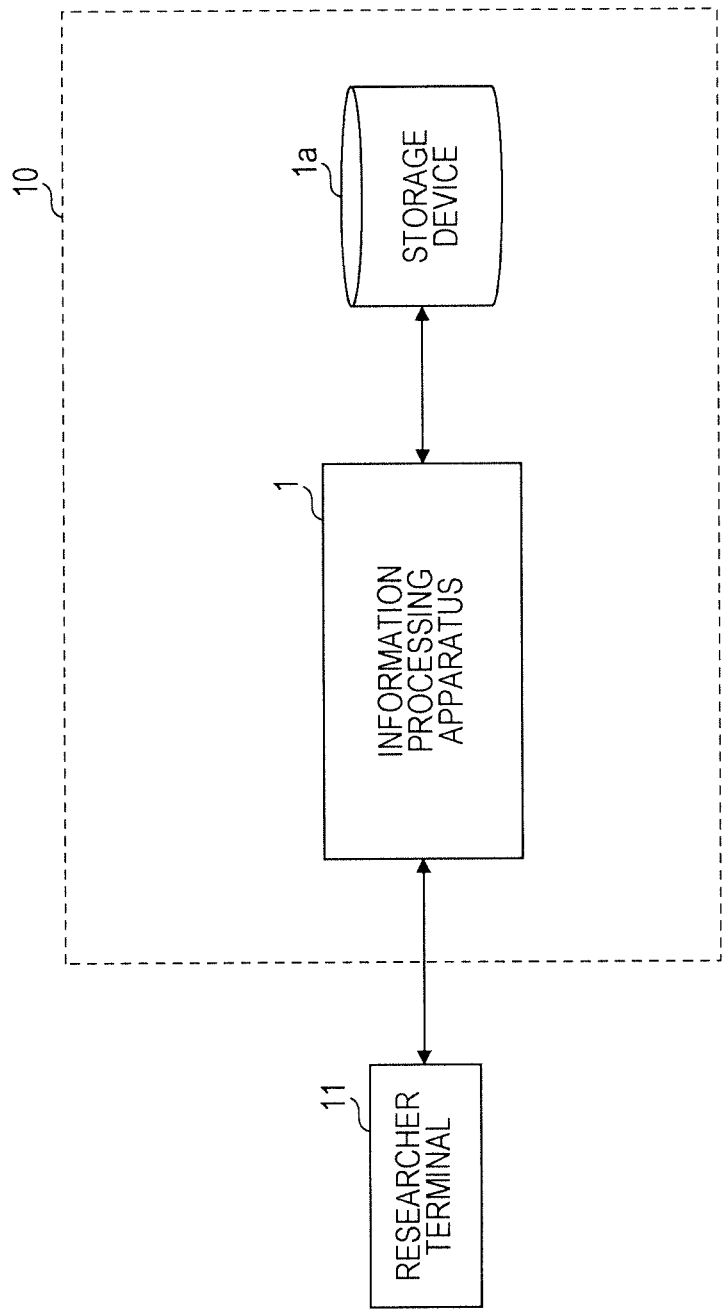
FIG. 1 is a diagram illustrating a configuration of an information processing system.

FIG. 1 is a diagram illustrating a configuration of an information processing system 10. The information processing system 10 illustrated in FIG. 1 includes an information processing apparatus 1 (hereinafter, may be referred to as a cache miss estimation apparatus 1) and a storage device 1a. The information processing apparatus 1 may access a researcher terminal 11 through a network NW that is configured of, for example, the Internet or an intranet.

The information processing apparatus 1 executes a process (hereinafter, may be referred to as a cache miss estimation process) including generation of an expression (hereinafter, may be referred to as a cache miss estimation expression) of estimating, for example, the number of times of cache misses occurring in an HPC system during execution of an application program. The information processing apparatus 1 is, for example, a physical machine that is different from a physical machine in which the HPC system operates.

The storage device 1a is an external disk device that is configured of, for example, a hard disk drive (HDD) or a solid state drive (SSD). Specifically, the storage device 1a stores, for example, various types of information that are referenced when the information processing apparatus 1 executes the cache miss estimation process. In addition, the storage device 1a stores, for example, the cache miss estimation expression generated by the information processing apparatus 1. The storage device 1a may be a disk device that is disposed in the information processing apparatus 1.

The researcher terminal 11 is, for example, a terminal into which an operator inputs information used. In the case of an input of information by the operator, the researcher terminal 11, for example, sends the input information to the information processing apparatus 1.

[Specific Example of Various Types of Information]

Next, various types of information that are referenced when the information processing apparatus 1 executes the cache miss estimation process will be described. Hereinafter, description will be provided with each information (program information 131, data information 132, positional information 133, cache information 134, loop information 135, and array information 136) stored in advance in the storage device 1a before execution of the cache miss estimation process.

[Program Information]

First, the program information 131 that is the source code of the application program executed by the HPC system will be described. FIG. 2 is a diagram illustrating the program information 131.

Specifically, in Statement S1, a process of setting an element i of an array A with zero is executed each time a loop variable i is incremented from 0 to X−1. In Statement S2, a process of setting an element j of an array B with zero is executed each time a loop variable j is incremented from 0 to Y−1. In Statement S3, a process of setting an element of an array C with a value set in the element of the array A is executed each time a loop variable k is incremented from 0 to Z−1. Parameter variables X, Y, and Z are variables that are input by a person (for example, a researcher) using the cache miss estimation expression when the number of times of cache misses is estimated with the cache miss estimation expression.

[Data Information]

Next, the data information 132 that includes sizes and addresses in a memory allocated to each array in the source code (program information 131) described in FIG. 2 will be described. FIG. 3 is a diagram illustrating the data information 132.

The data information 132 illustrated in FIG. 3 has a starting address $\mu_A$ of 0 the array A, a number $\beta_A$ of bytes per element (hereinafter, may be referred to as an array element) of the array A of 8, and a total number $\alpha_A$ of elements of the array A of 100. In addition, the data information 132 illustrated in FIG. 3 has a starting address $\mu_B$ of the array B of 800, a number $\beta_B$ of bytes per element of the array B of 8, and a total number $\alpha_B$ of elements of the array B of 100. Furthermore, the data information 132 illustrated in FIG. 3 has a starting address $\mu_C$ of the array C of 1600, a number $\beta_C$ of bytes per element of the array C of 8, and a total number $\alpha_C$ of elements of the array C of 100.

[Positional Information]

Next, the positional information 133 (hereinafter, may be referred to as specific positional information 133) that indicates a specific position in the source code described in FIG. 2 will be described. The positional information 133 is, for example, information that indicates a position in the source code described in FIG. 2 where an examination related to a cache miss is executed by the researcher (a position where the number of times a cache miss occurs is estimated). FIG. 4 is a diagram illustrating the positional information 133.

The positional information 133 illustrated in FIG. 4 has "S3" set in correspondence with "statement", "right" set in correspondence with "side", and "1" set in correspondence with "position" in the program information 131 described in FIG. 2. That is, the positional information 133 illustrated in FIG. 4 indicates that a cache miss is examined in a position that indicates, for example, a first term from left of terms included on a right-hand side of an expression described in Statement S3. That is, what is meant is that a cache miss at the time of fetching A[k] is examined.

[Cache Information]

Next, the cache information 134 that includes the associativity of a cache in a CPU in which a program is executed will be described. FIG. 5 is a diagram illustrating a specific example of the cache information 134.

The cache information 134 illustrated in FIG. 5 indicates an associativity A of the cache of 2, a block size B of the cache of 32, and a number S of sets of the cache of 4.

[Loop Information]

Next, the loop information 135 that includes a loop variable in the source code illustrated in FIG. 2 and a parameter variable corresponding to each loop variable will be described. FIG. 6 is a diagram illustrating a specific example of the loop information 135.

The loop information 135 illustrated in FIG. 6 indicates incrementing the loop variable i from 0 to X−1, incrementing the loop variable j from 0 to Y−1, and incrementing the loop variable k from 0 to Z−1. The parameter variables are X, Y, and Z.

[Array Information]

Next, the array information 136 that includes a position on the source code described in FIG. 2, information indicating a loop variable relevant to a loop surrounding the position, and information specifying an element of an array in the position will be described. FIG. 7 is a diagram illustrating a specific example of the array information 136.

Information that has "position number" equal to "P0" in the array information 136 illustrated in FIG. 7 has "S1" set as the "statement", "left" set as the "side", "1" set as the "position", and "A" set as "array". Furthermore, the information that has the "position number" equal to "P0" in the array information 136 illustrated in FIG. 7 has "i" set as "subscript expression of array" and "i" set as "relevant loop variable". That is, the information that has the "position number" equal to "P0" in the array information 136 illustrated in FIG. 7 indicates that the first term from left of terms included on the left-side hand of an expression described in Statement S1 is the array A. In addition, the information that has the "position number" equal to "P0" in the array information 136 illustrated in FIG. 7 indicates that the subscript expression and the loop variable of the array A are i. Other information included in FIG. 7 will not be described.

[Hardware Configuration of Information Processing Apparatus]

Figure 8:
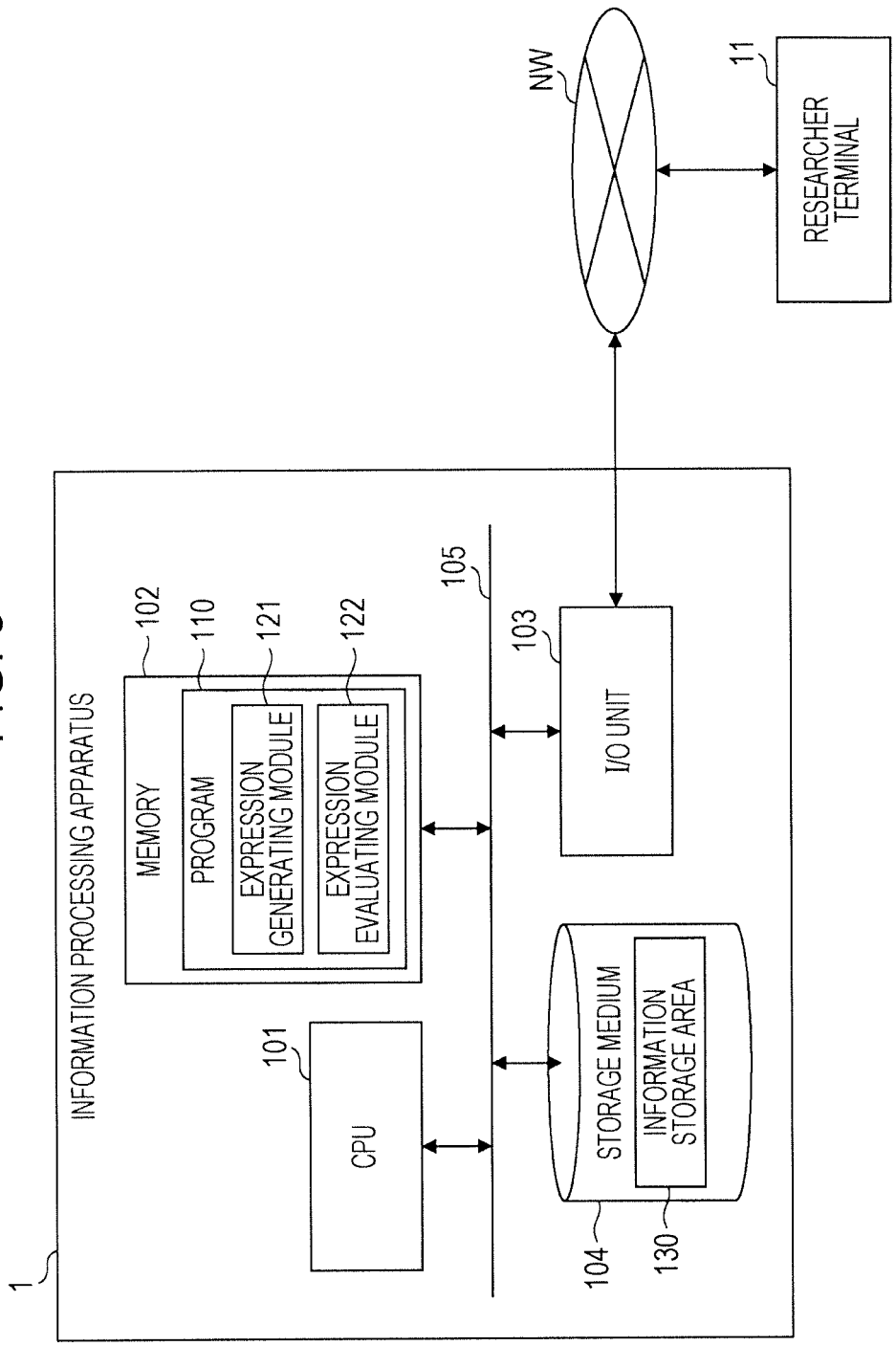
FIG. 8 is a diagram illustrating a hardware configuration of an information processing apparatus.
Figure 9:
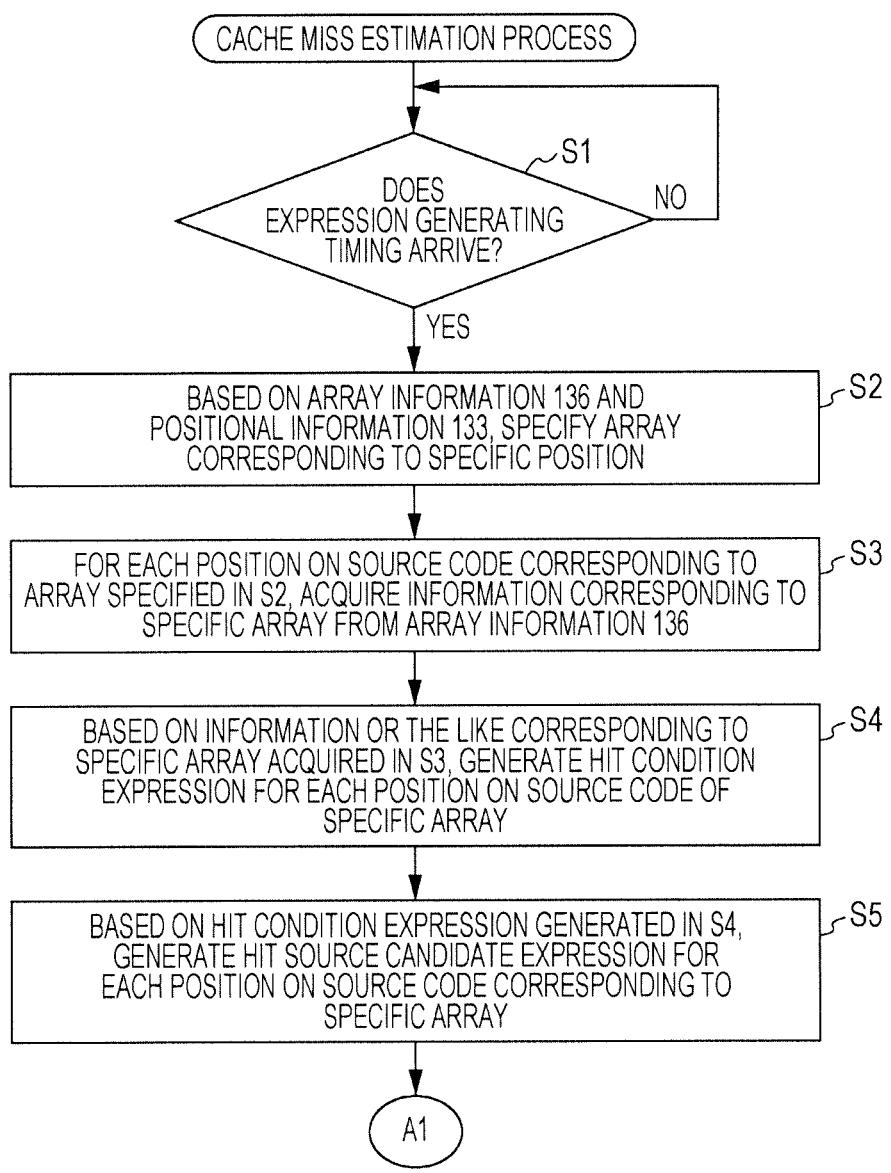
FIG. 9 is a flowchart illustrating a cache miss estimation process in an embodiment.

Next, a hardware configuration of the information processing apparatus 1 will be described. FIG. 8 is a diagram illustrating a hardware configuration of the information processing apparatus 1.

The information processing apparatus 1 includes a CPU 101 that is a processor, a memory 102, an external interface (I/O unit) 103, and a storage medium (storage) 104. Each unit is connected to each other through a bus 105.

The storage medium 104 stores a program 110 for the cache miss estimation process in a program storage area (not illustrated) in the storage medium 104.

As illustrated in FIG. 8, the CPU 101 loads the program 110 from the storage medium 104 into the memory 102 at the time of execution of the program 110 and executes the cache miss estimation process in cooperation with the program 110. Specifically, the CPU 101 in cooperation with the program 110 operates as an expression generating module 121 that generates the cache miss estimation expression and as an expression evaluating module 122 that estimates the number of times of cache misses by using the cache miss estimation expression.

The storage medium 104 includes an information storage area 130 (hereinafter, may be referred to as a storage module 130) that stores, for example, information used at the time of execution of the cache miss estimation process (the program information 131 or the like described in FIG. 2). The external interface 103 communicates with the researcher terminal 11 or the like. The storage device 1a described in FIG. 1 may correspond to the storage medium 104.

Embodiment

Next, an embodiment will be described. FIG. 9 to FIG. 14 are flowcharts illustrating the cache miss estimation process in the embodiment. FIG. 15 is a diagram illustrating the cache miss estimation process in the embodiment. Hereinafter, the expression generating module 121 that executes processes of S1 to S14 may be referred to as a first expression generating module 121, the expression generating module 121 that executes processes of S21 to S33 as a second expression generating module 121, and the expression generating module 121 that executes a process of S34 as a third expression generating module 121.

The expression generating module 121 waits until an expression generating timing arrives (NO in S1). The expression generating timing may be, for example, a timing when the researcher provides an input indicating execution of the cache miss estimation process into the information processing apparatus 1 through the researcher terminal 11.

In the case of arrival of the expression generating timing (YES in S1), the expression generating module 121 specifies a specific array corresponding to a specific position based on the array information 136 including a position on the source code of the program information 131, the information indicating a loop variable relevant to a loop surrounding the position, and the information specifying an element of an array in the position and on the positional information 133 indicating a specific position on the source code of the program information 131 (S2).

Specifically, the positional information 133 illustrated in FIG. 4 has "S3" set as the "statement", "right" set as the "side", and "1" set as the "position". Information that has the "statement" set with "S3", the "side" set with "right", and the "position" set with "1" in the array information 136 illustrated in FIG. 7 is information that has "positional information" set with "P2". Thus, the expression generating module 121 specifies P2 as the specific position. The information having the "positional information" set with "P2" has the "array" set with "A". Thus, the expression generating module 121 specifies the array A as the specific array in the process of S2.

Next, the expression generating module 121 acquires information corresponding to the specific array from the array information 136 for each position on the source code corresponding to the specific array specified in the process of S2 (S3).

Specifically, information that has the "array" set with "A" in the array information 136 illustrated in FIG. 7 is information having the "position number" set with "P0" and "P2". Thus, the expression generating module 121 specifies P0 and P2 (hereinafter, the position of a specific element in an array will be referred to as P2' in order to be distinguished from P2 that is the position of the array) as the position in which the array A which is the specific array is described. The expression generating module 121 acquires information having the "positional information" equal to "P0" and "P2" from the array information 136.

That is, in order to make a cache hit for an access in P2 which is the specific position, data of an access target is to be stored in the cache by a preceding access in execution of the program. Thus, in the process of S3, the expression generating module 121 specifies P0 and P2' as a position in which the data of the access target in P2 which is the specific position may be stored in the cache.

Next, based on the information or the like corresponding to the specific array and acquired in the process of S3, the expression generating module 121, for each position on the source code corresponding to the specific array, generates a hit condition expression in the case of an access in the specific array, the hit condition expression calculating a condition for the data of the access target being stored in the cache (S4). Hereinafter, description will be provided with each expression such as the hit condition expression generated as data in convex polyhedron format that represents a convex polyhedron in text format.

Specifically, the expression generating module 121 inputs information having the "positional information" equal to "P0" of the information acquired in the process of S3, the positional information 133 described in FIG. 4, the loop information 135 described in FIG. 6, the data information 132 described in FIG. 3, and the cache information 134 described in FIG. 5 into a program that formulates a set of states (behavior) of the cache. The output result of the program formulating the behavior of the cache is used as a hit condition expression $\Gamma_1$ in the relationship between P0 and P2 as illustrated in Expression (1) below. Expression (1) includes a variable s that identifies a cache set and a variable w that identifies data stored in the cache.

$$
\begin{aligned}
i &\geq 0 \quad (1)\\
-i + X &\geq 1\\
k &\geq 0\\
-k + Z &\geq 1\\
8i &\geq 0\\
w &\geq 0\\
s &\geq 0\\
-s &\geq -3\\
8i - 128w - 32s &\geq 0\\
-8i + 128w + 32s &\geq -31\\
128w + 32s &\geq -31\\
-128w - 32s &\geq -799\\
8k &\geq 0\\
w &\geq 0\\
s &\geq 0\\
-s &\geq -3\\
8k - 128w - 32s &\geq 0\\
-8k + 128w + 32s &\geq -31\\
128w + 32s &\geq -31\\
-128w - 32s &\geq -799
\end{aligned}
$$

In addition, the expression generating module 121 inputs information having the "positional information" equal to "P2" of the information acquired in the process of S3, the positional information 133 described in FIG. 4, the loop information 135 described in FIG. 6, the data information 132 described in FIG. 3, and the cache information 134 described in FIG. 5 into a program that formulates the behavior of the cache. The expression generating module 121 uses the output result of the program formulating the behavior of the cache as a hit condition expression $\Gamma_2$ in the relationship between P2' and P2 as illustrated in Expression (2) below. In Expression (2), the loop variable k that corresponds to P2' is represented as a loop variable k'.

$$
\begin{aligned}
-k' + k &\geq 1 \quad (2)\\
k' &\geq 0\\
-k' + Z &\geq 1\\
k &\geq 0\\
-k + Z &\geq 1\\
8k' &\geq 0\\
w &\geq 0\\
s &\geq 0\\
-s &\geq -3\\
8k' - 128w - 32s &\geq 0\\
-8k' + 128w + 32s &\geq -31\\
128w + 32s &\geq -31\\
-128w - 32s &\geq -799
\end{aligned}
$$

-continued
$$
\begin{aligned}
8k &\geq 0\\
w &\geq 0\\
s &\geq 0\\
-s &\geq -3\\
8k - 128w - 32s &\geq 0\\
-8k + 128w + 32s &\geq -31\\
128w + 32s &\geq -31\\
-128w - 32s &\geq -799
\end{aligned}
$$

The expression generating module 121, for each position on the source code corresponding to the specific array, generates a hit source candidate expression that indicates a candidate of a lastly made access of accesses storing data in the cache, based on the hit condition expression generated in the process of S4 (S5).

That is, an access that contributes to a cache hit for the access in the specific array is an access nearest to the access in the specific array in the case of presence of a plurality of accesses that satisfies the hit condition expression generated in the process of S4. Thus, the expression generating module 121, as the hit source candidate expression, uses a hit condition expression in the case of having the maximum value of the lexicographical order of a list of loop variables included in the hit condition expression.

Specifically, the expression generating module 121 inputs the hit condition expression $\Gamma_1$ (data in convex polyhedron format), the loop variable i included in the list of loop variables included in the hit condition expression $\Gamma_1$, and the parameter variables X and Z included in the list of parameter variables included in the hit condition expression $\Gamma_1$ into a program that executes parametric integer programming (PIP). A PIP process is a process of outputting a data list in convex polyhedron format that represents the maximum value of the lexicographical order in the list of loop variables included in the hit condition expression. The expression generating module 121 generates the output result of the program executing parametric integer programming as hit source candidate expressions and $\Gamma_{1,1}'$ of the $\Gamma_{1,2}'$ condition expression $\Gamma_1$ as illustrated in Expression (3) and Expression (4) below.

$$
\begin{aligned}
-i + X &= 1 \quad (3)\\
X - 16w - 4s &\geq 1\\
-k + Z &\geq 1\\
w &\geq 0\\
s &\geq 0\\
-s &\geq -3\\
4w + s &\geq 0\\
-4w - s &\geq -24\\
16w + 4s - k &\geq -3\\
-16w - 4s + k &\geq 0\\
-X + 16w + 4s &\geq -4
\end{aligned}
$$

$$\begin{aligned}
-i + 16w + 4s &= -3 \quad (4)\\
-16w - 4s + X &\geq 5\\
-k + Z &\geq 1\\
w &\geq 0\\
s &\geq 0\\
-s &\geq -3\\
4w + s &\geq 0\\
-4w - s &\geq -24\\
16w + 4s - k &\geq -3\\
-16w - 4s + k &\geq 0
\end{aligned}$$

In the same manner, the expression generating module 121 generates a hit source candidate expression $\Gamma_{2,1}'$ for the hit condition expression $\Gamma_2$ generated in the process of S4 as illustrated in Expression (5) below.

$$\begin{aligned}
-k' + k &= 1 \quad (5)\\
k &\geq 0\\
-k + Z &\geq 1\\
w &\geq 0\\
s &\geq 0\\
-s &\geq -3\\
4w + s &\geq 0\\
-4w - s &\geq -24\\
-k + 16w + 4s &\geq -3\\
k - 16w - 4s &\geq 1
\end{aligned}$$

Figure 10:
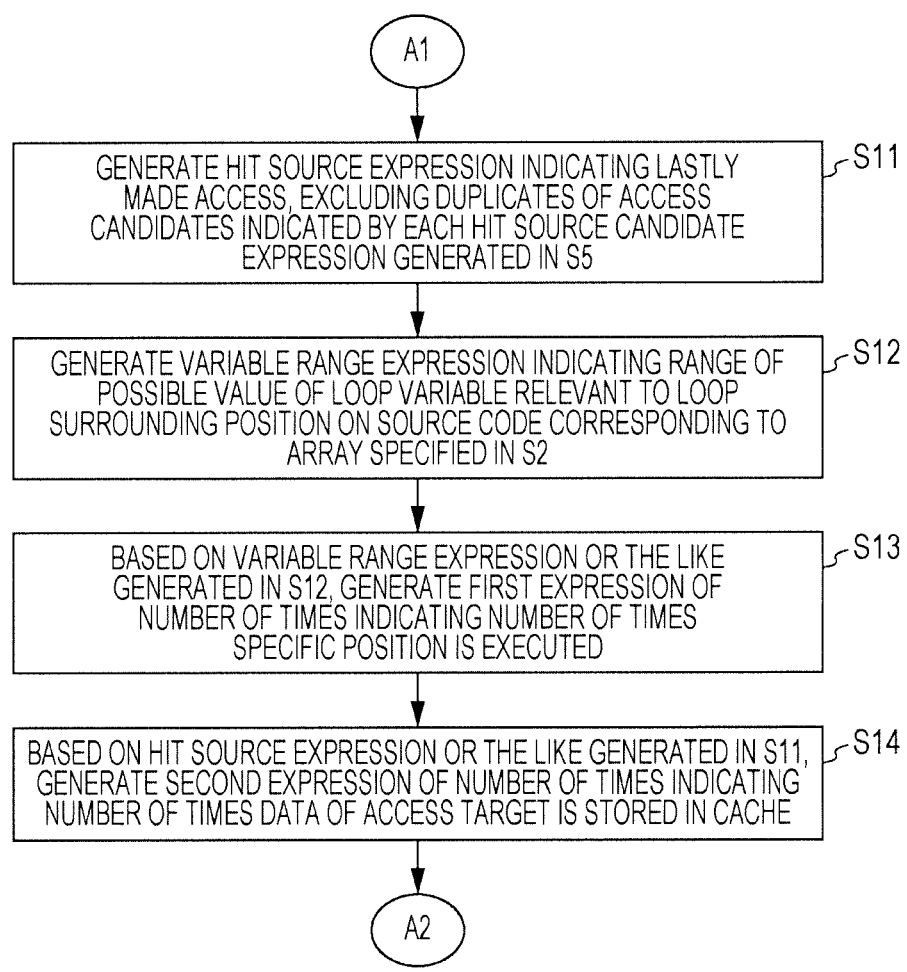
FIG. 10 is a flowchart illustrating the cache miss estimation process in the embodiment.

Next, as illustrated in FIG. 10, the expression generating module 121 generates a hit source expression that indicates the lastly made access of the accesses storing data in the cache, by excluding duplicates of the candidates of the access indicated by each hit source candidate expression generated in the process of S5 (S11).

That is, in the process of S5, the expression generating module 121 considers individual positions (for example, P0 and P2') of preceding accesses in execution of the program. However, a duplicate part may be present in the accesses indicated by the hit source candidate expressions generated in correspondence with the positions. Thus, the expression generating module 121 removes a duplicate part of the hit source candidate expressions in the process of S11.

Specifically, the expression generating module 121 inputs the hit source candidate expressions $\Gamma_{1,1}'$, $\Gamma_{1,2}'$, and $\Gamma_{2,1}'$ which are data lists in convex polyhedron format generated in the process of S5 into a program that executes a disjoint process. The disjoint process is a process of removing duplicates from the data list in convex polyhedron format. The expression generating module 121 uses the output result of the program executing the disjoint process as hit source expressions $C_1$, $C_2$, $C_3$, $C_4$, and $C_5$ as illustrated in Expression (6) to Expression (10) below.

$$\begin{aligned}
-16w - 4s + X &\geq 5 \quad (6)\\
-k + Z &\geq 1\\
w &\geq 0\\
s &\geq 0\\
-s &\geq -3\\
4w + s &\geq 0\\
-4w - s &\geq -24\\
16w + 4s - k &\geq -3\\
-16w - 4s + k &\geq 1\\
k &\geq 0
\end{aligned}$$

$$\begin{aligned}
-k + 16w + 4s &\geq -3 \quad (7)\\
-4w - s &\geq -24\\
-s &\geq -3\\
s &\geq 0\\
4w + s &\geq 0\\
k - 16w - 4s &\geq 1\\
16w + 4s - X &\geq 0\\
-k + Z &\geq 1
\end{aligned}$$

$$\begin{aligned}
-16w - 4s + X &\geq 1 \quad (8)\\
-k + Z &\geq 1\\
w &\geq 0\\
s &\geq 0\\
-s &\geq -3\\
4w + s &\geq 0\\
-4w - s &\geq -24\\
16w + 4s - k &\geq -3\\
-16w - 4s + k &\geq 1\\
16w + 4s - X &\geq -4\\
k &\geq 0
\end{aligned}$$

$$\begin{aligned}
k - 16w - 4s &= 0 \quad (9)\\
w &\geq 0\\
k - X &\geq -4\\
-k &\geq -96\\
-k + 16w &\geq -12\\
k - 16w &\geq 0\\
-k + Z &\geq 1\\
-k + X &\geq 1
\end{aligned}$$

$$\begin{aligned}
k - 16w - 4s &= 0 \quad (10)\\
w &\geq 0\\
-k + X &\geq 5\\
-k &\geq -96\\
-k + 16w &\geq -12\\
k - 16w &\geq 0\\
-k + Z &\geq 1
\end{aligned}$$

In the process of S11, the expression generating module 121 executes the disjoint process after removing the loop variable i and the loop variable k' (loop variables corresponding to P0 and P2') included in the hit source candidate expressions $\Gamma_{1,1}'$, $\Gamma_{1,2}'$, and $\Gamma_{2,1}'$ by replacing the loop variable i and the loop variable k' with the loop variable k. Accordingly, each of the hit source candidate expressions $\Gamma_{1,1}'$, $\Gamma_{1,2}'$, and $\Gamma_{2,1}'$ is represented as data in convex polyhedron format that includes only the same variables (k, w, and s) and the same parameter variables (X, Y, and Z).

The expression generating module 121, from a loop variable relevant to a loop surrounding a position on the source code corresponding to the specific array specified in the process of S2 and from a parameter variable corresponding to the loop variable, generates a variable range expression that indicates the range of a possible value of the loop variable (S12).

Specifically, the expression generating module 121 inputs the positional information 133 and the loop information 135 into, for example, a program that executes a program interpretation process used in the case of a compiler compiling the source code. The expression generating module 121 uses the output result of the program executing the program interpretation process as a variable range expression G that indicates the range of a possible value of the loop variable k as illustrated in Expression (11).

$$\begin{aligned} -k + Z &\geq 1 \\ k &\geq 0 \end{aligned} \tag{11}$$

Then, the expression generating module 121, from the variable range expression generated in the process of S12, information specifying a loop variable included in the variable range expression, and information specifying a parameter variable included in the variable range expression, generates a first expression of number of times that indicates the number of times the specific position specified in the process of S2 is executed (S13).

Specifically, the expression generating module 121 inputs the variable range expression G calculated in the process of S12 and information indicating inclusion of the loop variable k and the parameter variable Z in the variable range expression G into a program that executes a parametric discrete volume calculation technique which may be used as a volume process. The volume process is a process of generating an expression that represents the number of combinations of possible values of a loop variable. The expression generating module 121, as a first expression $V_G$ of number of times as illustrated in Expression (12) below, uses a list of pairs of a condition and an expression that are the output result of the program executing the parametric discrete volume calculation technique and represent the number of values of the loop variable k.

$$\begin{aligned} \text{condition:} \quad & Z \geq 1 \\ \text{count:} \quad & Z \end{aligned} \tag{12}$$

Next, the expression generating module 121, from the hit source expression generated in the process of S11, information specifying a loop variable included in the hit source expression, and information specifying a parameter variable included in the hit source expression, generates a second expression of number of times that indicates the number of times the data of the access target is stored in the cache in the case of execution of the specific position specified in the process of S2 (S14).

Specifically, in the same manner as the process of S13, the expression generating module 121 inputs the hit source expression $C_1$ generated in the process of S11 and information indicating inclusion of the loop variable k, the parameter variable X, and the parameter variable Z in the hit source expression $C_1$ into the program executing the parametric discrete volume calculation technique. The expression generating module 121, as a second expression $V_{C_1}$ of number of times as illustrated in Expression (13) below, uses a list of pairs of a condition and an expression that are the output result of the program executing the parametric discrete volume calculation technique and represent the number of values of the loop variable k.

$$\begin{aligned} \text{condition:} \quad & X \geq 102 \\ & Z \geq 101 \\ \text{count:} \quad & 75 \\[4pt] \text{condition:} \quad & X \geq 102 \\ & Z \geq 99 \\ & -Z \geq -100 \\ \text{count:} \quad & Z + -25 \\[4pt] \text{condition:} \quad & X - Z \geq 4 \\ & Z \geq 1 \\ & -Z \geq -98 \\ \text{count:} \quad & \tfrac{3}{4}Z + (-2)*\left(\left(f\!\left(\tfrac{1}{4}Z + \tfrac{1}{2}\right)\right)^2\right) + f\!\left(\tfrac{1}{4}Z + \tfrac{1}{2}\right) + (2)*\left(\left(f\!\left(\tfrac{1}{4}Z + \tfrac{3}{4}\right)\right)^2\right) + -1f\!\left(\tfrac{1}{4}Z + \tfrac{3}{4}\right) + -\tfrac{3}{8} \\[4pt] \text{condition:} \quad & X - Z \geq 1 \\ & X \geq 5 \\ & -X + Z \geq -3 \\ & -X \geq -101 \\ \text{count:} \quad & \left(-\tfrac{1}{8}\right)*((X)^2) + \left(\tfrac{1}{4}Z + f\!\left(\tfrac{1}{4}X + \tfrac{3}{4}\right) + \tfrac{1}{2}\right)*(X) + \left(-\tfrac{1}{8}\right)*((Z)^2) + \left(-1f\!\left(\tfrac{1}{4}X + \tfrac{3}{4}\right) + \tfrac{1}{4}\right)*(Z) + \\ & (-2)*\left(\left(f\!\left(\tfrac{1}{4}X + \tfrac{3}{4}\right)\right)^2\right) + -2f\!\left(\tfrac{1}{4}X + \tfrac{3}{4}\right) + (2)*\left(\left(f\!\left(\tfrac{1}{4}Z + \tfrac{3}{4}\right)\right)^2\right) + -1f\!\left(\tfrac{1}{4}Z + \tfrac{3}{4}\right) + -\tfrac{3}{4} \end{aligned} \tag{13}$$

condition $\quad X \geq 5$
$\quad\quad\quad -X + Z \geq 0$
$\quad\quad\quad -X \geq -101$ count: $\frac{3}{4}X + -3f\left(\frac{1}{4}X + \frac{3}{4}\right) + -\frac{3}{4}$ In the same manner, the expression generating module 121 generates a second expression $V_{C2}$ of number of times, a second expression $V_{C3}$ of number of times, a second expression $V_{C4}$ of number of times, and a second expression $V_{C5}$ of number of times respectively from the hit source expression $C_2$, the hit source expression $C_3$, the hit source expression $C_4$, and the hit source expression $C_5$ generated in the process of S11.

That is, in the process of S13, the expression generating module 121 generates an expression that indicates the number of times of execution in the specific position on the source code of the program information 131 (the number of times an access to data is made in the specific position). In addition, in the process of S14, the expression generating module 121 generates an expression that indicates the number of times the data of the access target is stored in the cache in the case of execution of the specific position. The expression generating module 121 generates an expression that is obtained by subtracting the expression generated in the process of S14 from the expression generated in the process of S13 as described later. Accordingly, as described later, the expression generating module 121 may estimate the number of times of cache misses due to the data of the access target not being stored once in the cache (hereinafter, this cache miss may be referred to as an initial reference miss) in the case of execution of the specific position.

Figure 11:
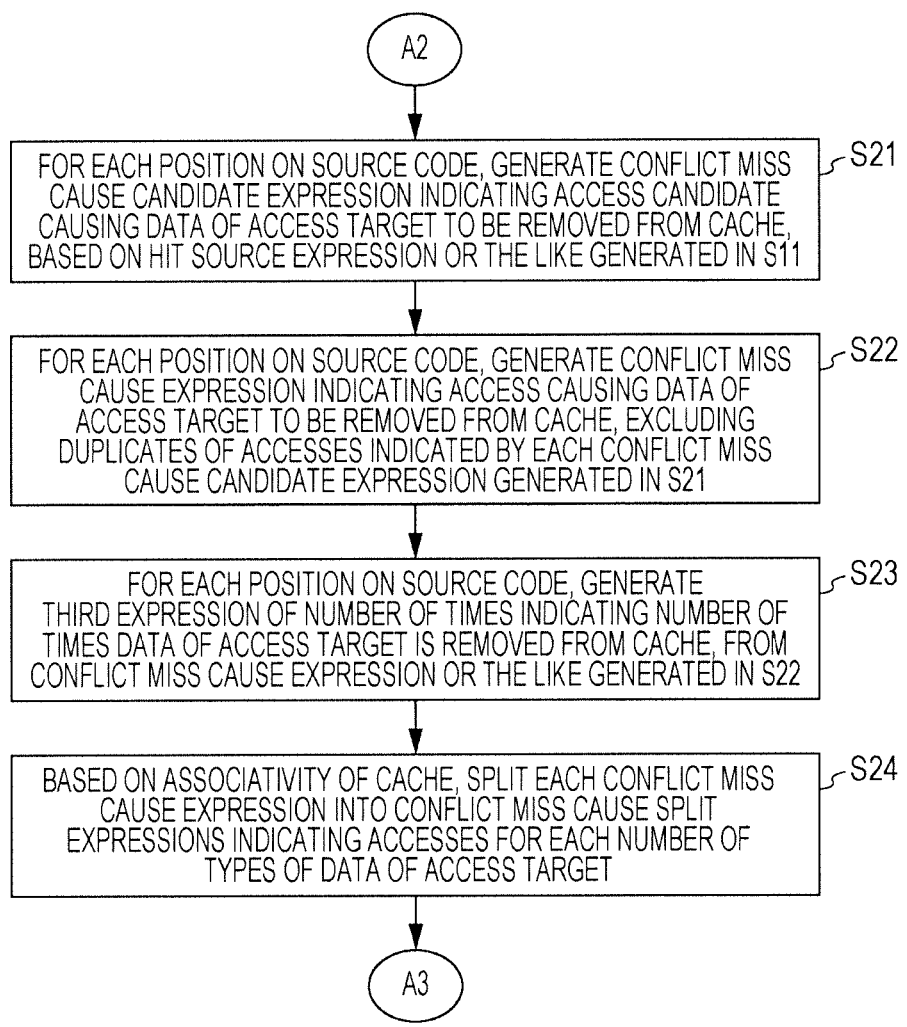
FIG. 11 is a flowchart illustrating the cache miss estimation process in the embodiment.
Figure 12:
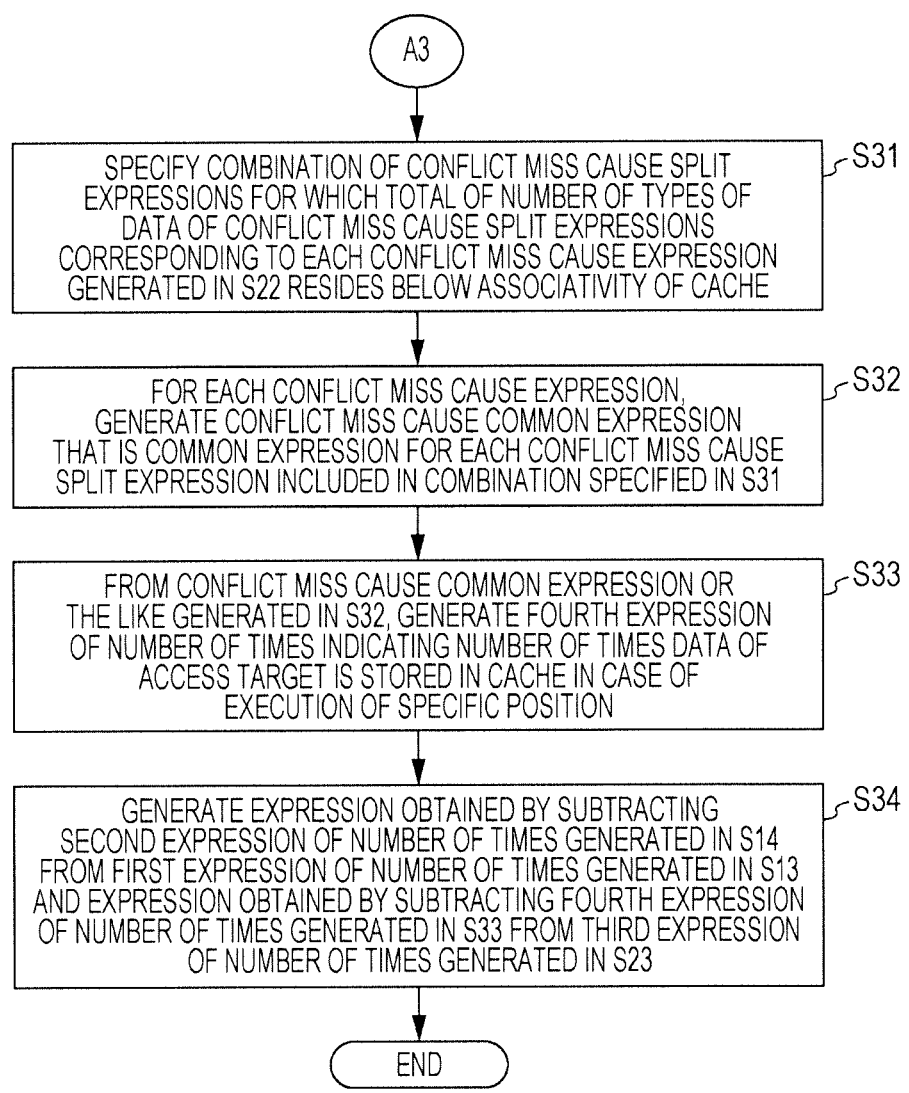
FIG. 12 is a flowchart illustrating the cache miss estimation process in the embodiment.

Next, as illustrated in FIG. 11, the expression generating module 121, for each position on the source code, generates a conflict miss cause candidate expression that indicates a candidate of an access causing the data of the access target in the specific array specified in the process of S2 to be removed from the cache, based on the hit source expression or the like generated in the process of S11 (S21).

That is, cache misses that occur in the case of execution of the specific position include a cache miss that occurs due to the data of the access target previously stored in the cache being removed from the cache by a subsequent access. Thus, in the process of S21 and later, the expression generating module 121 generates an expression for estimation of the number of times of cache misses accompanied by removal of the data of the access target (hereinafter, this cache miss may be referred to as a conflict miss).

Specifically, the expression generating module 121 inputs, for example, the hit source expression $C_4$ generated in the process of S11, the positional information 133 described in FIG. 4, the loop information 135 described in FIG. 6, the data information 132 described in FIG. 3, and the cache information 134 described in FIG. 5 into the program that formulates the behavior of the cache. The expression generating module 121 generates conflict miss cause candidate expressions $H_{4,1}$, $H_{4,2}$, and $H_{4,3}$ that are the output result of the program formulating the behavior of the cache, as illustrated in Expression (14) to Expression (16) below. Expression (14) to Expression (16) include a loop variable x (the loop variables i, j, and k are collectively referred to as a loop variable x) that represents a candidate of the access causing the data of the access target in the specific array specified in the process of S2 to be removed from the cache and a wraparound variable Q that is a wraparound variable identifying each data (hereinafter, may be referred to as an identification variable).

$$
\begin{aligned}
k - 16w - 4s &= 0 \quad (14)\\
-k + X &\geq 1\\
-k + Z &\geq 1\\
w &\geq 0\\
k - 16w &\geq 0\\
-k + 16w &\geq -12\\
k &\geq 0\\
-k &\geq -96\\
x &\geq 0\\
k - X &\geq -4\\
Z - x &\geq 1\\
k - x &\geq 1\\
-k + 16w - 16Q &\geq -96\\
Q &\geq 0\\
k - 16w + 16Q &\geq 0\\
k - 16w - x + 16Q &\geq -3\\
-k + 16w + x - 16Q &\geq 0
\end{aligned}
$$

-continued $$\begin{aligned}
k - 16w - 4s &= 0 \\
-k + X &\geq 1 \\
-k + Z &\geq 1 \\
w &\geq 0 \\
k - 16w &\geq 0 \\
-k + 16w &\geq -12 \\
k &\geq 0 \\
-k &\geq -96 \\
x &\geq 0 \\
k - X &\geq -4 \\
Z - x &\geq 1 \\
k - x &\geq 1 \\
-k + 16w - 16Q &\geq -296 \\
Q &\geq 0 \\
k - 16w + 16Q &\geq 200 \\
k - 16w - x + 16Q &\geq 197 \\
-k + 16w + x - 16Q &\geq -200
\end{aligned} \quad (15)$$

$$\begin{aligned}
k - 16w - 4s &= 0 \\
-k + X &\geq 1 \\
-k + Z &\geq 1 \\
w &\geq 0 \\
k - 16w &\geq 0 \\
-k + 16w &\geq -12 \\
k &\geq 0 \\
-k &\geq -96 \\
x &\geq 0 \\
k - X &\geq -4 \\
-x + Y &\geq 1 \\
-k + 16w - 16Q &\geq -196 \\
Q &\geq 0 \\
k - 16w + 16Q &\geq 100 \\
k - 16w - x + 16Q &\geq 97 \\
-k + 16w + x - 16Q &\geq -100
\end{aligned} \quad (16)$$

The expression generating module 121 also executes the process of S21 for the hit source expression $C_1$, the hit source expression $C_2$, the hit source expression $C_3$, and the hit source expression $C_5$.

Then, the expression generating module 121, for each position on the source code, generates a conflict miss cause expression that indicates the access causing the data of the access target in the specific position to be removed from the cache, by excluding duplicates of the accesses indicated by each conflict miss cause candidate expression generated in the process of S21 (S22). Hereinafter, details of the process of S22 will be described.

[Details of Process of S22]

Figure 13:
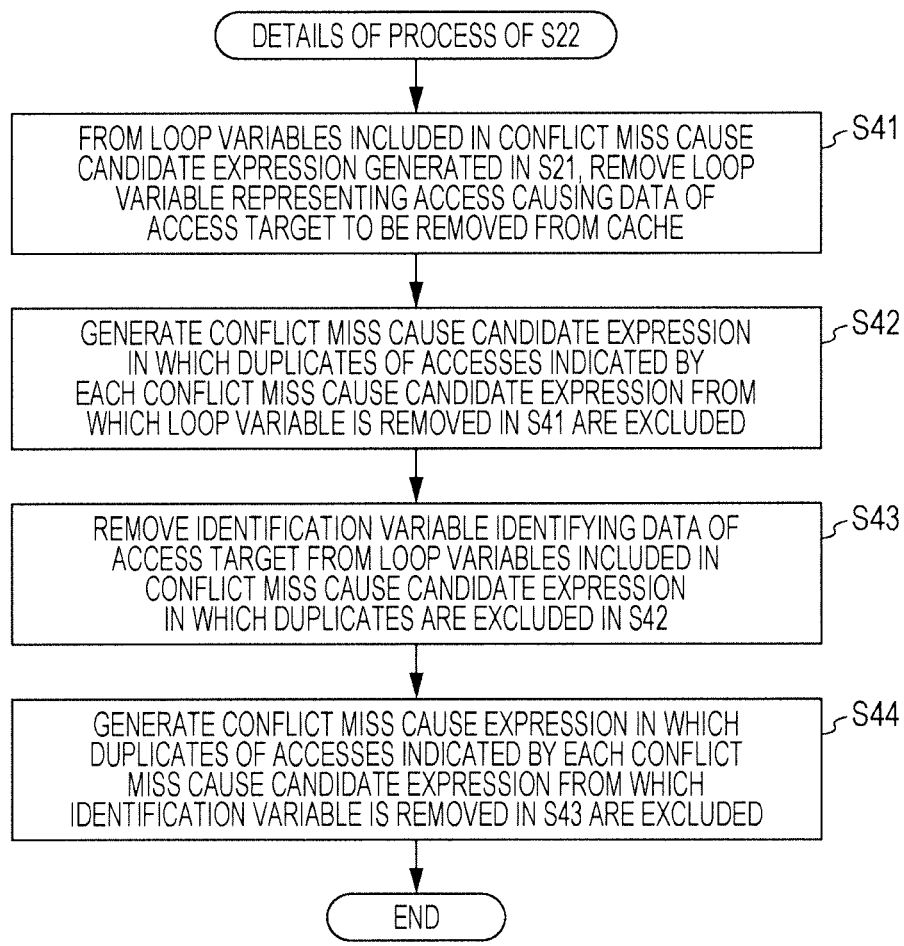
FIG. 13 is a flowchart illustrating the cache miss estimation process in the embodiment.

FIG. 13 is a diagram illustrating details of the process of S22. The expression generating module 121, from loop variables included in the conflict miss cause candidate expression generated in S21, removes a loop variable that represents the access causing the data of the access target in the specific array to be removed from the cache (S41). That is, the expression generating module 121 removes (replaces with another loop variable) a loop variable that is not used for estimation of the number of times of cache misses.

Then, the expression generating module 121 generates a conflict miss cause candidate expression in which duplicates of the accesses indicated by each conflict miss cause candidate expression from which the loop variable is removed in the process of S41 are excluded (S42). That is, the conflict miss cause candidate expression generated in the process of S21 is generated from accesses in each position that may be accessed in the source code. These accesses may include accesses to the same data in the same cache set. Thus, in the process of S42, the expression generating module 121 excludes duplicates of the conflict miss cause candidate expressions from which the loop variable is removed in the process of S41.

Specifically, the expression generating module 121, into a program that executes a projectout process, inputs the conflict miss cause candidate expression $H_{4,1}$ and information specifying the loop variable x that is a loop variable representing the access causing the data of the access target in the specific position of P2 to be removed from the cache. The projectout process is a process of removing a variable from the data list in convex polyhedron format. The expression generating module 121 uses the output result of the program executing the projectout process as a conflict miss cause candidate expression $H_{4,1}'$ from which the loop variable x is removed. In the same manner, the expression generating module 121, respectively from the conflict miss cause candidate expressions $H_{4,2}$ and $H_{4,3}$, generates conflict miss cause candidate expressions $H_{4,2}'$ and $H_{4,3}'$ from which the loop variable x is removed.

Then, in the process of S42, the expression generating module 121 inputs the conflict miss cause candidate expressions $H_{4,1}'$, $H_{4,2}'$, and $H_{4,3}'$ from which the loop variable x is removed into the program that executes the disjoint process. The expression generating module 121 uses the output result of the program executing the disjoint process as conflict miss cause candidate expressions $J_{4,1}$, $J_{4,2}$, and $J_{4,3}$ in which duplicates are excluded, as illustrated in Expression (17), Expression (18), and Expression (19) below.

$$
\begin{aligned}
4s + 16w - k &= 0 \quad (17)\\
-s &\geq -3\\
s &\geq 0\\
s + 4Q &\geq 50\\
w - Q &\geq -12\\
4s + 16w - X &\geq -4\\
-s - 4w &\geq -24\\
-4s - 16w + X &\geq 1\\
-4s - 16w + Z &\geq 1
\end{aligned}
$$

$$
\begin{aligned}
4s + 16w - k &= 0 \quad (18)\\
-4s - 16Q + Y &\geq -99\\
-s - 4Q &\geq -49\\
-s &\geq -3\\
s &\geq 0\\
s + 4Q &\geq 25\\
4s + 16w - X &\geq -4\\
-s - 4w &\geq -24\\
w &\geq 0\\
-4s - 16w + X &\geq 1\\
-4s - 16w + Z &\geq 1
\end{aligned}
$$

$$
\begin{aligned}
4s + 16w - k &= 0 \quad (19)\\
Q &\geq 0\\
-s &\geq -3\\
s &\geq 0\\
w - Q &\geq 1\\
4s + 16w - X &\geq -4\\
-s - 4w &\geq -24\\
-4s - 16w + X &\geq 1\\
-4s - 16w + Z &\geq 1
\end{aligned}
$$

Returning to FIG. 13, the expression generating module 121 removes the identification variable that identifies the data of the access target from loop variables included in the conflict miss cause candidate expression in which duplicates are excluded in the process of S42 (S43). The expression generating module 121 generates a conflict miss cause expression in which duplicates of the accesses indicated by each conflict miss cause candidate expression from which the identification variable is removed in the process of S43 are excluded (S44).

That is, while, in the process of S42, the expression generating module 121 excludes duplicates of combinations of the loop variable k and the wraparound variable Q from the conflict miss cause candidate expressions generated in the process of S21, duplicates in the case of considering only the loop variable k also are to be excluded. Thus, the expression generating module 121 removes the wraparound variable Q in the process of S43 and excludes duplicates in the process of S44 in the case of considering only the loop variable k.

Specifically, the expression generating module 121, into the program that executes the projectout process, inputs the conflict miss cause candidate expression $J_{4,1}$ in which duplicates are excluded and the wraparound variable Q that is an identification variable identifying the data of the access target. The expression generating module 121 uses the output result of the program executing the projectout process as a conflict miss cause expression $J_{4,1}'$ as illustrated in Expression (20) below. In the same manner, the expression generating module 121, respectively from the conflict miss cause candidate expressions $J_{4,2}$ and $J_{4,3}$, generates conflict miss cause expressions $J_{4,2}'$ and $J_{4,3}'$ from which the wraparound variable Q is removed, as illustrated in Expression (21) and Expression (22) below. Expression (21) includes a variable $e_0$ that is a variable (a variable for operation) automatically introduced by the projectout process.

$$
\begin{aligned}
-4s - 16w + k &= 0 \quad (20)\\
-s &\geq -3\\
s &\geq 0\\
-4s - 16w + Z &\geq 1\\
s + 4w &\geq 2\\
4s + 16w - X &\geq -4\\
-s - 4w &\geq -24\\
-4s - 16w + X &\geq 1
\end{aligned}
$$

$$
\begin{aligned}
-4s - 16w + k &= 0 \quad (21)\\
-4s + Y - 16e_0 &\geq -99\\
-s - 4e_0 &\geq -49\\
-s &\geq -3\\
s &\geq 0\\
s + 4e_0 &\geq 25\\
4s + 16w - X &\geq -4\\
-s - 4w &\geq -24\\
w &\geq 0\\
-4s - 16w + X &\geq 1\\
-4s - 16w + Z &\geq 1
\end{aligned}
$$

$$
\begin{aligned}
-4s - 16w + k &= 0 \quad (22)\\
-4s - 16w + Z &\geq 1\\
-s &\geq -3\\
s &\geq 0\\
w &\geq 1\\
4s + 16w - X &\geq -4\\
-s - 4w &\geq -24\\
-4s - 16w + X &\geq 1
\end{aligned}
$$

Then, in the process of S44, the expression generating module 121 inputs the conflict miss cause expressions $J_{4,1}'$, $J_{4,2}'$, and $J_{4,3}'$ into the program that executes the disjoint process. The expression generating module 121 uses the output result of the program executing the disjoint process as conflict miss cause expressions $J_{4,1}''$, $J_{4,2}''$, and $J_{4,3}''$ in which duplicates are excluded, as illustrated in Expression (23), Expression (24), and Expression (25) below.

$$\begin{aligned}
4s + 16w - k &= 0 \quad &(23)\\
-s &\geq -3\\
s &\geq 0\\
-s - 4w &\geq -24\\
w &\geq 1\\
-4s - 16w + X &\geq 1\\
4s + 16w - X &\geq -4\\
-4s - 16w + Z &\geq 1
\end{aligned}$$

$$\begin{aligned}
4s - k &= 0 \quad &(24)\\
-w &= 0\\
-s &\geq -3\\
s &\geq 0\\
-s + 4e_0 &\geq 0\\
s - 4e_0 &\geq -3\\
-4s + X &\geq 1\\
4s - X &\geq -4\\
-4s + Z &\geq 1\\
-4s + 16e_0 + Y &\geq 13
\end{aligned}$$

$$\begin{aligned}
4s + 16w - k &= 0 \quad &(25)\\
-s &\geq -3\\
4s - Y - 16e_0 &\geq -12\\
-s - 4w &\geq -24\\
s + 4w &\geq 2\\
-4s - 16w + X &\geq 1\\
4s + 16w - X &\geq -4\\
-4s - 16w + Z &\geq 1\\
-w &\geq 0\\
s - 4e_0 &\geq -3\\
-s + 4e_0 &\geq 0\\
-4s + Z &\geq 1
\end{aligned}$$

Returning to FIG. 11, the expression generating module 121, for each position on the source code, generates a third expression of number of times that indicates the number of times the data of the access target is removed from the cache in the case of execution of the specific position, from the conflict miss cause expression or the like generated in the process of S22 (S23).

Specifically, the expression generating module 121, into the program that executes the parametric discrete volume calculation technique which may be used as the volume process, inputs the conflict miss cause expression $J_{4,1''}$ after exclusion of duplicates and information indicating inclusion of the loop variable k, the parameter variable X, and the parameter variable Z in the conflict miss cause expression $J_{4,1''}$ after exclusion of duplicates. The expression generating module 121, as a third expression $V_{J_{4,1''}}$ of number of times as illustrated in Expression (26) and Expression (27) below, uses a list of pairs of a condition and an expression that are the output result of the program executing the parametric discrete volume calculation technique and represent the number of values of the loop variable k.

$$\begin{aligned}
&X \geq 29 \quad &(26)\\
\text{condition: } &-X + Z \geq 1\\
&-X \geq -31\\
\text{volume: } &1
\end{aligned}$$

-continued $$\begin{aligned}
\text{condition: } &X - Z \geq 0\\
&-X \geq -31\\
&Z \geq 29\\
\text{volume: } &1\\
\text{condition: } &X \geq 98\\
&-X \geq -100\\
&Z \geq 98\\
\text{volume: } &1\\
&X \geq 17\\
\text{condition: } &-X + Z \geq 1\\
&-X \geq -19\\
\text{volume: } &1\\
&X - Z \geq 0\\
\text{condition: } &-X \geq -19\\
&Z \geq 17\\
\text{volume: } &1
\end{aligned}$$

-continued $$\text{condition} \begin{array}{rcl} X - Z & \geq & 0 \\ X & \geq & 20 \\ -X + Z & \geq & -3 \\ -Z & \geq & -28 \end{array}$$

volume: $\left(-\dfrac{1}{64}\right)*((X)^2) +$ $\left(\dfrac{1}{4}f\left(\dfrac{1}{16}X+\dfrac{11}{16}\right)+\dfrac{1}{16}f\left(\dfrac{1}{4}X+\dfrac{3}{4}\right)+\dfrac{11}{32}\right)*(X)+$ $\dfrac{1}{4}Z+\left(-1f\left(\dfrac{1}{4}X+\dfrac{3}{4}\right)+-\dfrac{17}{4}\right)*\left(f\left(\dfrac{1}{16}X+\dfrac{11}{16}\right)\right)+$ $-\dfrac{5}{16}f\left(\dfrac{1}{4}X+\dfrac{3}{4}\right)+-1f\left(\dfrac{1}{4}Z+\dfrac{3}{4}\right)+-\dfrac{293}{64}$ $$\text{condition} \begin{array}{rcl} X - Z & \geq & 0 \\ -Z & \geq & -97 \\ -X + Z & \geq & -3 \\ X & \geq & 32 \end{array}$$

volume: $-\dfrac{1}{4}X+\dfrac{1}{4}Z+(2)*\left(\left(f\left(\dfrac{1}{16}X+\dfrac{11}{16}\right)\right)^2\right)+$ $\left(-1f\left(\dfrac{1}{4}X+\dfrac{3}{4}\right)+-1\right)*\left(f\left(\dfrac{1}{16}X+\dfrac{11}{16}\right)\right)+$ $(-2)*\left(\left(f\left(\dfrac{1}{16}X+\dfrac{15}{16}\right)\right)^2\right)+$ $\left(f\left(\dfrac{1}{4}X+\dfrac{3}{4}\right)+2\right)*\left(f\left(\dfrac{1}{16}X+\dfrac{15}{16}\right)\right)+$ $\dfrac{3}{4}f\left(\dfrac{1}{4}X+\dfrac{3}{4}\right)+(2)*\left(\left(f\dfrac{1}{16}Z+\dfrac{1}{8}\right)\right)^2\right)+$ $\left(-1f\left(\dfrac{1}{4}Z+\dfrac{3}{4}\right)+-\dfrac{7}{4}\right)*\left(f\left(\dfrac{1}{16}Z+\dfrac{1}{8}\right)\right)+$ $(-2)*\left(\left(f\left(\dfrac{1}{16}Z+\dfrac{15}{16}\right)\right)^2\right)+$ $\left(f\left(\dfrac{1}{4}Z+\dfrac{3}{4}\right)+1\right)*\left(f\left(\dfrac{1}{16}Z+\dfrac{15}{16}\right)\right)+$ $-\dfrac{13}{16}f\left(\dfrac{1}{4}Z+\dfrac{3}{4}\right)+\dfrac{113}{128}$ $$\text{condition} \begin{array}{rcl} X & \geq & 20 \\ -X + Z & \geq & 1 \\ -X & \geq & -28 \end{array}$$

volume: $\left(-\dfrac{1}{64}\right)*((X)^2)+$ $\left(\dfrac{1}{4}f\left(\dfrac{1}{16}X+\dfrac{11}{16}\right)+\dfrac{1}{16}f\left(\dfrac{1}{4}X+\dfrac{3}{4}\right)+\dfrac{19}{32}\right)*(X)+$ $\left(-1f\left(\dfrac{1}{4}X+\dfrac{3}{4}\right)+-\dfrac{17}{4}\right)*\left(f\left(\dfrac{1}{16}X+\dfrac{11}{16}\right)\right)+$ $-\dfrac{21}{16}f\left(\dfrac{1}{4}X+\dfrac{3}{4}\right)+-\dfrac{293}{64}$ $$\text{condition} \begin{array}{rcl} X & \geq & 32 \\ -X + Z & \geq & 1 \\ -X & \geq & -97 \end{array}$$

volume: $(2)*\left(\left(f\left(\dfrac{1}{16}X+\dfrac{1}{8}\right)\right)^2\right)+$ $\left(-1f\left(\dfrac{1}{4}X+\dfrac{3}{4}\right)+-\dfrac{7}{4}\right)*\left(f\left(\dfrac{1}{16}X+\dfrac{1}{8}\right)\right)+$ $(2)*\left(\left(f\left(\dfrac{1}{16}X+\dfrac{11}{16}\right)\right)^2\right)+$ -continued $\left(-1f\left(\dfrac{1}{4}X+\dfrac{3}{4}\right)+-1\right)*\left(f\left(\dfrac{1}{16}X+\dfrac{11}{16}\right)\right)+$ $(-4)*\left(\left(f\left(\dfrac{1}{16}X+\dfrac{15}{16}\right)\right)^2\right)+$ $\left(2f\left(\dfrac{1}{4}X+\dfrac{3}{4}\right)+3\right)*\left(f\left(\dfrac{1}{16}X+\dfrac{15}{16}\right)\right)+-\dfrac{1}{16}f\left(\dfrac{1}{4}X+\dfrac{3}{4}\right)+\dfrac{113}{128}$ In the same manner, the expression generating module 121 generates a third expression $V_{J4,2''}$ of number of times and a third expression $V_{J4,3''}$ of number of times respectively from the conflict miss cause expression $J_{4,2''}$ after exclusion of duplicates and from the conflict miss cause expression $J_{4,3''}$ after exclusion of duplicates.

Then, based on the associativity of the cache, the expression generating module 121, for each conflict miss cause expression, splits each conflict miss cause expression into conflict miss cause split expressions that indicate accesses for each number of types of data of the access target (S24). As a supplementary description to "types of data", successive pieces of data, of a plurality of pieces of data in one cache set, on the memory are regarded as the same type, and pieces of data that are in separate positions on the memory are regarded as different types.

That is, even in the case of the cache storing data by an access indicated by the conflict miss cause expression, a cache miss due to an access in the specific position does not occur in the case of the number of types of data stored in the cache by the access indicated by the conflict miss cause expression being smaller than the associativity of the cache. At this point, the third expression of number of times generated in the process of S23 does not consider the case of the number of pieces of data stored in the cache by the access indicated by the conflict miss cause expression being smaller than the associativity of the cache. Thus, in the process of S24 and later, the expression generating module 121 generates an expression for estimation of the number of times a cache miss does not occur due to the number of pieces of data stored in the cache by the access indicated by the conflict miss cause expression being smaller than the associativity of the cache. Accordingly, as described later, the expression generating module 121 may more accurately estimate the number of times the data of the access target is removed from the cache in the case of execution of the specific position.

Specifically, in the process of S24, the expression generating module 121 splits the conflict miss cause expression in number less than or equal to the associativity of the cache. More specifically, in the case of the cache having the associativity A of 2 as illustrated in the cache information 134 in FIG. 6, the expression generating module 121 splits the conflict miss cause expression $J_{4,1}'$ into a plurality of expressions including a conflict miss cause split expression $\Psi_{J4,1'=1}$ that corresponds to the case of storing one type of data in the cache and a conflict miss cause split expression $\Psi_{J4,1'=0}$ that corresponds to the case of storing zero types of data in the cache. In the same manner, the expression generating module 121 splits the conflict miss cause expression $J_{4,2}'$ and the conflict miss cause expression $J_{4,3}'$. Hereinafter, details of the process of S24 will be described.

[Details of Process of S24]

Figure 14:
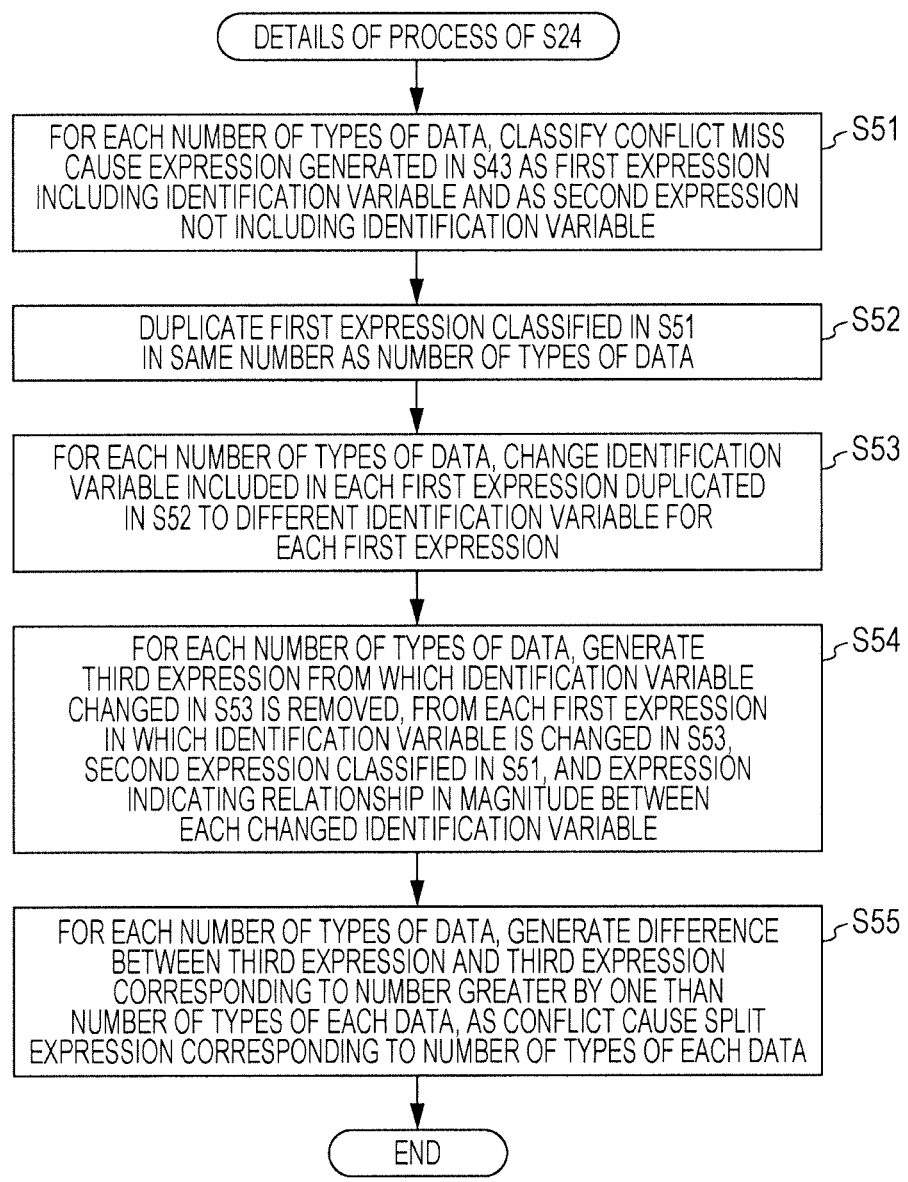
FIG. 14 is a flowchart illustrating the cache miss estimation process in the embodiment.

FIG. 14 is a diagram illustrating details of the process of S24. The expression generating module 121, for each number of types of data of the access target corresponding to the conflict miss cause expression, classifies the conflict miss cause candidate expression as a first expression that includes the identification variable identifying the data of the access target or as a second expression that does not include the identification variable (S51). That is, the expression generating module 121 splits the conflict miss cause candidate expression for each number less than or equal to the associativity of the cache.

Specifically, the expression generating module 121 classifies the conflict miss cause expression $J_{4,1}'$ as the first expression that includes the wraparound variable Q or as the second expression that does not include the wraparound variable Q as illustrated in Expression (28) and Expression (29) below.

$$\begin{aligned} 4s + 16w - k &= 0 \\ -s &\geq -3 \\ s &\geq 0 \\ 4s + 16w - X &\geq -4 \\ -s - 4w &\geq -24 \\ -4s - 16w + X &\geq 1 \\ -4s - 16w + Z &\geq 1 \end{aligned} \quad (28)$$

$$\begin{aligned} s + 4Q &\geq 50 \\ w - Q &\geq -12 \end{aligned} \quad (29)$$

Then, the expression generating module 121 duplicates the first expression classified in the process of S51 in the same number as the number of types of data of the access target corresponding to the conflict miss cause expression (S52). The expression generating module 121, for each number of types of data, changes the identification variable included in each first expression duplicated in the process of S52 to an identification variable that is different for each first expression (S53).

Specifically, in the case of the cache having the associativity A of 2 as illustrated in the cache information 134 in FIG. 6, the expression generating module 121 duplicates the first expression classified in the process of S51 into two expressions. The expression generating module 121 changes the wraparound variable Q included in the duplicated expressions respectively to a wraparound variable $Q_1$ and a wraparound variable $Q_2$ as illustrated in Expression (30) and Expression (31) below.

$$\begin{aligned} s + 4Q_1 &\geq 50 \\ w - Q_1 &\geq -12 \end{aligned} \quad (30)$$

$$\begin{aligned} s + 4Q_2 &\geq 50 \\ w - Q_2 &\geq -12 \end{aligned} \quad (31)$$

Next, the expression generating module 121, for each number of types of data of the access target corresponding to the conflict miss cause expression, generates a third expression in which the identification variable changed in the process of S53 is removed, from each first expression in which the identification variable is changed in the process of S53, the second expression classified in the process of S51, and an expression that indicates the relationship in magnitude between each changed identification variable (S54).

Specifically, the expression generating module 121 inputs the first expression including the wraparound variable $Q_1$, the second expression including the wraparound variable $Q_2$, an expression indicating the relationship in magnitude between the wraparound variable $Q_1$ and the wraparound variable $Q_2$, and information specifying the wraparound variable $Q_1$ and the wraparound variable $Q_2$ into a program that removes a variable The expression generating module 121 acquires the output result of the program removing a variable as a third expression $\Psi_{J4,1'\geq2}$ that is an expression split from the conflict miss cause expression and is an expression in the case of the number of types of data of the access target corresponding to the conflict miss cause expression being greater than or equal to 2.

The expression generating module 121, for each number of types of data, generates the difference between the third expression corresponding to the number of each type of data and the third expression corresponding to a number greater by 1 than the number of each type of data, as a conflict cause split expression that corresponds to the number of each type of data (S55).

Specifically, the expression generating module 121 inputs the third expression $\Psi_{J4,1'\geq2}$ and a third expression $\Psi_{J4,1'\geq1}$ acquired in the process of S54 into a program that calculates the difference between ranges indicated by expressions. The expression generating module 121 acquires the output result of the program calculating the difference between ranges indicated by expressions as the conflict miss cause split expression $\Psi_{J4,1'=1}$ as illustrated in Expression (32) below.

In addition, the expression generating module 121 inputs the third expression $\Psi_{J4,1'\geq1}$ and a third expression $\Psi_{J4,1'\geq0}$ (hit source expression $C_4$) into a program that calculates the difference between expressions. The expression generating module 121 acquires the output result of the program calculating the difference between expressions as the conflict miss cause split expression $\Psi_{J4,1'=0}$ as illustrated in Expression (33) below.

$$\begin{aligned} k - 16w - 4s &= 0 \\ -k &\geq -23 \\ k &\geq 8 \\ -k + 16w &\geq -12 \\ k - 16w &\geq 0 \\ -k + X &\geq 1 \\ k - X &\geq -4 \\ -k + Z &\geq 1 \end{aligned} \quad (32)$$

$$\begin{aligned} k - 4s &= 0 \\ -w &= 0 \\ -k &\geq -7 \\ k &\geq 0 \\ -k + X &\geq 1 \\ k - X &\geq -4 \\ -k + Z &\geq 1 \end{aligned} \quad (33)$$

Returning to FIG. 12, the expression generating module 121 specifies a combination of conflict miss cause split expressions for which the total of the number of types of data of conflict miss cause split expressions corresponding to each conflict miss cause expression generated in the process of S22 resides below the associativity of the cache (S31).

Specifically, in the case of presence of the conflict miss cause split expression $\Psi_{J4,1'=0}$, the conflict miss cause split expression $\Psi_{J4,1'=1}$, a conflict miss cause split expression $\Psi_{J4,2'=0}$, a conflict miss cause split expression $\Psi_{J4,2'=1}$, and a conflict miss cause split expression $\Psi_{J4,3'=0}$, the expression generating module 121 specifies a combination of the conflict miss cause split expression $\Psi_{J4,1'=1}$, the conflict miss cause split expression $\Psi_{J4,2'=0}$, and the conflict miss cause split expression $\Psi_{J4,3'=0}$. In addition, in this case, the expression generating module 121 specifies a combination of the conflict miss cause split expression $\Psi_{J4,1'=0}$, the conflict miss cause split expression $\Psi_{J4,2'=1}$, and the conflict miss cause split expression $\Psi_{J4,3'=0}$.

The expression generating module 121, for each conflict miss cause expression, generates a conflict miss cause common expression that is a common expression for each conflict miss cause split expression included in the combinations specified in the process of S31 (S32).

Specifically, the expression generating module 121 inputs the conflict miss cause split expression $\Psi_{J4,1'=1}$, the conflict miss cause split expression $\Psi_{J4,2'=0}$, and the conflict miss cause split expression $\Psi_{J4,3'=0}$ into a program that calculates a common part of ranges indicated by expressions. The expression generating module 121 uses the output result of the program calculating a common part of ranges indicated by expressions as a conflict miss cause common expression $Z_{4,1}$ as illustrated in Expression (34) below. In the same manner, the expression generating module 121 inputs the conflict miss cause split expression $\Psi_{J4,1'=0}$, the conflict miss cause split expression $\Psi_{J4,2'=1}$, and the conflict miss cause split expression $\Psi_{J4,3'=0}$ into the program that calculates a common part of ranges indicated by expressions. The expression generating module 121 uses the output result of the program calculating a common part of ranges indicated by expressions as a conflict miss cause common expression $Z_{4,2}$ as illustrated in Expression (35) below.

$$\begin{aligned}
k - 4s &= 0 \\
-w &= 0 \\
-k &\geq -12 \\
k &\geq 8 \\
-k + X &\geq 1 \\
k - X &\geq -4 \\
-k + Z &\geq 1 \\
k - 16e_0 &\geq -12 \\
-16e_0 - Y &\geq -12 \\
-k + 16e_0 &\geq 0
\end{aligned} \quad (34)$$

$$\begin{aligned}
k - 4s &= 0 \\
-w &= 0 \\
-k &\geq -7 \\
k &\geq 0 \\
-k + X &\geq 1 \\
k - X &\geq -4 \\
-k + Z &\geq 1 \\
-k + 16e_0 &\geq 0 \\
k - 16e_0 &\geq -12 \\
-k + 16e_0 + Y &\geq 13 \\
Y &\geq 1 \\
k - 16e_0 - Y &\geq -28
\end{aligned} \quad (35)$$

Then, the expression generating module 121, from the conflict miss cause common expression or the like generated in the process of S32, generates a fourth expression of number of times that indicates the number of times the case of the cache storing data of the specific array specified in the process of S2 occurs for data of an array corresponding to the specific position (S33).

Specifically, the expression generating module 121 inputs the conflict miss cause common expression $Z_{4,1}$ generated in the process of S32 and information indicating inclusion of the loop variable k, the parameter variable X, the parameter variable Y, and the parameter variable Z in the conflict miss cause common expression $Z_{4,1}$ into a program that executes the parametric discrete volume calculation technique which may be used as the volume process. The expression generating module 121, as a fourth expression $V_{Z4,1}$ of number of times as illustrated in Expression (36), Expression (37), and Expression (38) below, uses a list of pairs of a condition and an expression that are the output result of the program executing the parametric discrete volume calculation technique and represent the number of values of the loop variable k. In the same manner, the expression generating module 121 generates a fourth expression $V_{Z4,2}$ from the conflict miss cause common expression $Z_{4,2}$ generated in the process of S32.

While the above example describes the case of executing the processes of S21 to S33 for the hit source expression $C_4$, the expression generating module 121 executes the processes of S21 to S33 in the same manner for the hit source expression $C_1$, the hit source expression $C_2$, the hit source expression $C_3$, and the hit source expression $C_5$.

$$\text{condition:} \begin{aligned} X &\geq 14 \\ -X &\geq -16 \\ Y &\geq 0 \\ -Y &\geq -12 \\ Z &\geq 14 \end{aligned} \quad (36)$$

$$\begin{aligned}
\text{volume:} &\left(\frac{1}{64}Y + -\frac{1}{16}f\left(\frac{1}{4}Y + \frac{3}{4}\right) + -\frac{5}{64}\right)*(X) + \\
&\left(-\frac{1}{4}f\left(\frac{1}{16}X + \frac{15}{16}Y + \frac{7}{16}\right) + -\frac{1}{4}f\left(\frac{1}{16}Y + \frac{7}{16}\right) + -\frac{3}{32}\right)*(Y) + \\
&\left(f\left(\frac{1}{4}Y + \frac{3}{4}\right) + \frac{5}{4}\right)*\left(f\left(\frac{1}{16}X + \frac{15}{16}Y + \frac{7}{16}\right)\right) + \\
&\left(f\left(\frac{1}{4}Y + \frac{3}{4}\right) + \frac{9}{4}\right)*\left(f\left(\frac{1}{16}Y + \frac{7}{16}\right)\right) + \frac{1}{8}f\left(\frac{1}{4}Y + \frac{3}{4}\right) + \frac{23}{32}
\end{aligned}$$

$$\text{condition:} \begin{aligned} X &\geq 9 \\ -X + Z &\geq 1 \\ -X &\geq -11 \\ Y &\geq 0 \\ -Y &\geq -12 \end{aligned}$$

$$\begin{aligned}
\text{volume:} &\left(-\frac{1}{64}Y + \frac{1}{16}f\left(\frac{1}{4}Y + \frac{3}{4}\right) + \frac{5}{64}\right)*(X) + \\
&\left(\frac{1}{4}f\left(\frac{1}{16}X + \frac{15}{16}Y + \frac{11}{16}\right) + \frac{1}{4}f\left(\frac{1}{16}Y + \frac{3}{4}\right) + -\frac{11}{64}\right)*(Y) + \\
&\left(-1f\left(\frac{1}{4}Y + \frac{3}{4}\right) + -\frac{5}{4}\right)*\left(f\left(\frac{1}{16}X + \frac{15}{16}Y + \frac{11}{16}\right)\right) + \\
&\left(-1f\left(\frac{1}{4}Y + \frac{3}{4}\right) + -\frac{1}{4}\right)*\left(f\left(\frac{1}{16}Y + \frac{3}{4}\right)\right) + \frac{7}{16}f\left(\frac{1}{4}Y + \frac{3}{4}\right) + \frac{51}{64}
\end{aligned}$$

$$\text{condition:} \begin{aligned} X - Z &\geq 0 \\ -X &\geq -11 \\ Y &\geq 0 \\ -Y &\geq -12 \\ Z &\geq 9 \end{aligned}$$

-continued volume: $\left(-\frac{1}{64}Z+\frac{1}{4}f\left(\frac{1}{16}Y+\frac{3}{4}\right)+-\frac{1}{4}f\left(\frac{1}{16}Y+\frac{15}{16}Z+\frac{1}{4}\right)+\frac{1}{16}\right)*$
$(Y)+\left(\frac{1}{16}f\left(\frac{1}{4}Y+\frac{3}{4}\right)+\frac{5}{64}\right)*(Z)+$
$\left(-1f\left(\frac{1}{4}Y+\frac{3}{4}\right)+-\frac{1}{4}\right)*\left(f\left(\frac{1}{16}Y+\frac{3}{4}\right)\right)+$
$\left(f\left(\frac{1}{4}Y+\frac{3}{4}\right)+\frac{5}{4}\right)*\left(f\left(\frac{1}{16}Y+\frac{15}{16}Z+\frac{1}{4}\right)\right)+-\frac{1}{2}f\left(\frac{1}{4}Y+\frac{3}{4}\right)+-\frac{3}{8}$ condition:
$X \geq 14$
$-X \geq -16$
$-Y \geq 1$
$Z \geq 11$ volume: 1 condition:
$X \geq 9$
$-X+Z \geq 1$
$-X \geq -11$
$-Y \geq 1$ volume: 1 condition:
$X-Z \geq 0$
$-X \geq -11$
$-Y \geq 1$
$Z \geq 9$ volume: 1 condition:
$-Y \geq -12$
$-X+Z \geq -3$
$-Z \geq -13$
$X-Z \geq 0$
$X \geq 12$
$Y \geq 0$ volume: $\left(-\frac{1}{64}\right)*((X)^2)+$
$\left(\frac{1}{32}Y+\frac{1}{4}f\left(\frac{1}{16}X+\frac{15}{16}Y+\frac{7}{16}\right)+\frac{1}{16}f\left(\frac{1}{4}X+\frac{3}{4}\right)+$
$-\frac{1}{16}f\left(\frac{1}{4}Y+\frac{3}{4}\right)+\frac{1}{64}\right)*(X)+$
$\left(-\frac{1}{32}Z+-\frac{1}{4}f\left(\frac{1}{16}X+\frac{15}{16}Y+\frac{7}{16}\right)+-\frac{1}{16}f\left(\frac{1}{4}X+\frac{3}{4}\right)+$
$-\frac{1}{4}f\left(\frac{1}{16}Y+\frac{15}{16}Z+\frac{1}{4}\right)+\frac{1}{16}f\left(\frac{1}{4}Z+\frac{3}{4}\right)+\frac{7}{64}\right)*(Y)+$
$\left(\frac{1}{64}\right)*((Z)^2)+\left(\frac{1}{4}f\left(\frac{1}{16}Y+\frac{15}{16}Z+\frac{1}{4}\right)+\frac{1}{16}f\left(\frac{1}{4}Y+\frac{3}{4}\right)+$
$-\frac{1}{16}f\left(\frac{1}{4}Z+\frac{3}{4}\right)+-\frac{1}{8}\right)*(Z)+$
$\left(-1f\left(\frac{1}{4}X+\frac{3}{4}\right)+f\left(\frac{1}{4}Y+\frac{3}{4}\right)+-2\right)*\left(f\left(\frac{1}{16}X+\frac{15}{16}Y+\frac{7}{16}\right)\right)+$
$\frac{7}{16}f\left(\frac{1}{4}X+\frac{3}{4}\right)+$
$\left(f\left(\frac{1}{4}Y+\frac{3}{4}\right)+-1f\left(\frac{1}{4}Z+\frac{3}{4}\right)+-1\right)*\left(f\left(\frac{1}{16}Y+\frac{15}{16}Z+\frac{1}{4}\right)\right)+$
$-\frac{11}{16}f\left(\frac{1}{4}Y+\frac{3}{4}\right)+\frac{1}{4}f\left(\frac{1}{4}Z+\frac{3}{4}\right)+\frac{9}{8}$ condition:
$X-Z \geq 0$
$X \geq 12$
$-X+Z \geq -3$
$-Y \geq 1$
$-Z \geq -13$ volume: $-\frac{1}{4}X+\frac{1}{4}Z+f\left(\frac{1}{4}X+\frac{3}{4}\right)+-1f\left(\frac{1}{4}Z+\frac{3}{4}\right)+1$ condition:
$X \geq 12$
$-X+Z \geq 1$
$-X \geq -13$
$Y \geq 0$
$-Y \geq -12$ volume: (38)
$\left(\frac{1}{4}f\left(\frac{1}{16}X+\frac{15}{16}Y+\frac{7}{16}\right)+-\frac{1}{4}f\left(\frac{1}{16}X+\frac{15}{16}Y+\frac{11}{16}\right)+\frac{1}{8}\right)*(X)+$
$\left(-\frac{1}{4}f\left(\frac{1}{16}X+\frac{15}{16}Y+\frac{7}{16}\right)+\frac{1}{4}f\left(\frac{1}{16}X+\frac{15}{16}Y+\frac{11}{16}\right)+-\frac{1}{8}\right)*(Y)+$
$\left(-1f\left(\frac{1}{4}X+\frac{3}{4}\right)+f\left(\frac{1}{4}Y+\frac{3}{4}\right)+-2\right)*\left(f\left(\frac{1}{16}X+\frac{15}{16}Y+\frac{7}{16}\right)\right)+$
$\left(f\left(\frac{1}{4}X+\frac{3}{4}\right)+-1f\left(\frac{1}{4}Y+\frac{3}{4}\right)+1\right)*\left(f\left(\frac{1}{16}X+\frac{15}{16}Y+\frac{11}{16}\right)\right)+$
$-\frac{1}{4}f\left(\frac{1}{4}X+\frac{3}{4}\right)+\frac{1}{4}f\left(\frac{1}{4}Y+\frac{3}{4}\right)+\frac{3}{16}$ condition:
$X \geq 12$
$-X+Z \geq 1$
$-X \geq -13$
$-Y \geq 1$ volume: 1

The expression generating module 121 generates an expression that is obtained by subtracting the second expression of number of times generated in the process of S14 from the first expression of number of times generated in the process of S13 and an expression that is obtained by subtracting the fourth expression of number of times generated in the process of S33 from the third expression of number of times generated in the process of S23 (S34).

Specifically, as illustrated in Expression (39) below, the expression generating module 121 generates an expression that is obtained by subtracting the second expression $V_{C1}$ of number of times, the second expression $V_{C2}$ of number of times, the second expression $V_{C3}$ of number of times, the second expression $V_{C4}$ of number of times, and the second expression $V_{C5}$ of number of times from the first expression $V_G$ of number of times.

$$M_{cold}=V_G-(V_{C1}+V_{C2}+V_{C3}+V_{C4}+V_{C5}) \qquad (39)$$

That is, the first expression $V_G$ of number of times is an expression that indicates the number of times the specific position in the source code of the program information 131 is executed. The second expression $V_{C1}$ of number of times, the second expression $V_{C2}$ of number of times, the second expression $V_{C3}$ of number of times, the second expression $V_{C4}$ of number of times, and the second expression $V_{C5}$ of number of times are expressions that indicate the number of times the data of the access target is stored in the cache in the case of execution of the specific position. Thus, Expression (39) above is an expression that indicates the number of times of cache misses due to the data of the access target not being stored once in the cache in the case of execution of the specific position.

In addition, the expression generating module 121, for the hit source expression $C_4$, generates an expression that is obtained by subtracting the fourth expression $V_{Z4,1}$ of number of times and the fourth expression $V_{Z4,2}$ of number of times from the total of the third expression $V_{J4,1''}$ of number of times, the third expression $V_{J4,2''}$ of number of times, and the third expression $V_{J4,3''}$ of number of times as illustrated in Expression (40) below.

$$M_{Conflict,C4} = V_{J4,1''} + V_{J4,2''} + V_{J4,3''} - (V_{Z4,1} + V_{Z4,2}) \quad (40)$$

That is, the third expression $V_{J4,1''}$ of number of times, the third expression $V_{J4,2''}$ of number of times, and the third expression $V_{J4,3''}$ of number of times are expressions that indicate the maximum value of the number of times of cache misses accompanied by the data of the access target in the specific position being removed by the access indicated by the conflict miss cause expression. The fourth expression $V_{Z4,1}$ of number of times and the fourth expression $V_{Z4,2}$ of number of times are expressions that indicate the number of times a cache miss does not occur due to the number of types of data stored in the cache by the access indicated by the conflict miss cause expression being smaller than the associativity of the cache (the number of times of cache hits). Thus, Expression (40) above is an expression that indicates the number of times of cache misses due to the data of the access target being removed from the cache in the case of execution of the specific position.

Next, the expression generating module 121 generates the same expression as Expression (40) for each of the hit source expression $C_1$, the hit source expression $C_2$, the hit source expression $C_3$, and the hit source expression $C_5$. The expression generating module 121 generates an expression that is obtained by adding each expression generated for each hit source expression as illustrated in Expression (41) below.

$$M_{Conflict} = V_{J4,1''} + V_{J4,2''} + V_{J4,3''} - (V_{Z4,1} + V_{Z4,2}) + V_{J5,1''} + V_{J5,2''} + V_{5,3''} - (V_{Z5,1} + V_{Z5,2} + V_{Z5,3}) \quad (41)$$

As illustrated in FIG. 15, the expression generating module 121 may store Expression (39) above and Expression (41) above in the information storage area 130 as cache estimation expression information 137. Hereinafter, Expression (39) may be referred to as an initial reference miss estimation expression and Expression (41) as a conflict miss estimation expression.

[Expression Using Process]

Figures 16, 17, 18:
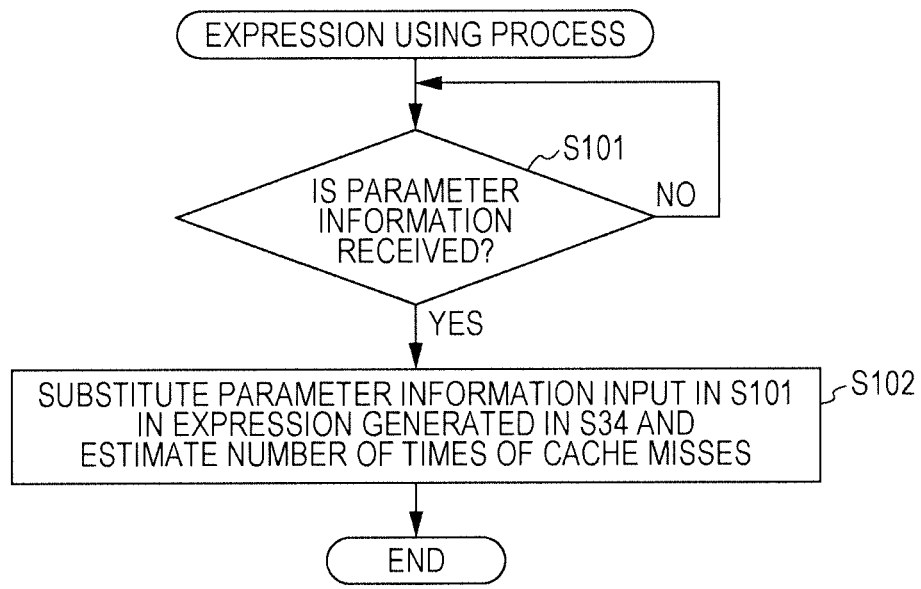
FIG. 16 is a flowchart illustrating an expression using process.
FIG. 17 is a diagram illustrating the expression using process.
FIG. 18 is a diagram illustrating the expression using process.

Next, a process of estimating the number of times of cache misses by using the cache miss estimation expression (hereinafter, may be referred to as an expression using process) in the cache miss estimation process in the embodiment will be described. FIG. 16 is a flowchart illustrating the expression using process. FIG. 17 and FIG. 18 are diagrams illustrating the expression using process.

The expression evaluating module 122 of the information processing apparatus 1 waits until parameter information is received (NO in S101). Specifically, the expression evaluating module 122 waits until, for example, the researcher inputs parameter information into the information processing apparatus 1. The parameter information is information that includes a specific value of a parameter variable included in the source code of the program information 131. Specifically, the parameter information illustrated in FIG. 17 indicates the parameter variable X of 10, the parameter variable Y of 10, and the parameter variable Z of 6.

That is, a variable included in the initial reference miss estimation expression and the conflict miss estimation expression is only a parameter variable as illustrated in Expression (26) or the like. Thus, the expression evaluating module 122 may estimate the number of times of initial reference misses and the number of times of conflict misses in the case of execution of the source code of the program information 131 described in FIG. 2 by substituting the parameter information in the initial reference miss estimation expression and the conflict miss estimation expression.

In the case of an input of the parameter information (YES in S101), the expression evaluating module 122 substitutes the parameter information input in the process of S101 in the initial reference miss estimation expression and the conflict miss estimation expression generated in the process of S34 to estimate the number of times of cache misses (S102).

Accordingly, the information processing apparatus 1 may calculate the number of times of cache misses without executing a program in a real machine or a simulator. Thus, the information processing apparatus 1 may efficiently calculate the number of times of cache misses.

[Specific Example of Expression Using Process]

Next, a specific example of the expression using process will be described. Hereinafter, description will be provided with an input of the parameter information indicating all of the parameter variable X, the parameter variable Y, and the parameter variable Z equal to 10 in the process of S101.

In this case, the expression evaluating module 122 determines whether or not the condition $Z \le 1$ is satisfied. Thus, the expression evaluating module 122 calculates the value of the variable range expression $V_G$ to be 10 from Expression (12). In addition, in this case, the expression evaluating module 122 determines the conditions $X \le 5$, $-X + Z \le 0$, and $-X \le -101$ to be satisfied. Thus, the expression evaluating module 122 calculates the value of the first expression $V_{C1}$ of number of times to be 6 from Expression (13). f(x) indicates a floor function of x. In the same manner, the expression evaluating module 122 calculates the first expression $V_{C2}$ of number of times, the first expression $V_{C3}$ of number of times, the first expression $V_{C4}$ of number of times, and the first expression $V_{C5}$ of number of times to be respectively 0, 1, 1, and 2.

Therefore, in this case, the expression evaluating module 122 calculates the number of times of initial reference misses to be 0 as illustrated in FIG. 18. In addition, in the same manner, the expression evaluating module 122 calculates the number of times of conflict misses to be 1.

In the case of estimating the number of times of cache misses with the initial loop (the loop including Statement S1) and the second loop (the loop including Statement S2) ended and the loop variable k of the third loop (the loop including Statement S3) being equal to 5 in the source code of the program information 131 illustrated in FIG. 2, the researcher inputs parameter information indicating the parameter variable X and the parameter variable Y of 10 and the parameter variable Z of 6 into the information processing apparatus 1. Accordingly, the researcher may acquire the number of times of outputs from the information processing apparatus 1 as the number of times of cache misses in the case of the loop variable k of the third loop being equal to 5.

Meanwhile, in the case of estimating the number of times of cache misses that occur while the loop variable k of the third loop changes from 3 to 7, the researcher inputs parameter information indicating the parameter variable X and the parameter variable Y of 10 and the parameter variable Z of 3 into the information processing apparatus 1.

In addition, in this case, the researcher inputs parameter information indicating the parameter variable X and the parameter variable Y of 10 and the parameter variable Z of 8 into the information processing apparatus 1. The researcher subtracts the number of times of outputs from the information processing apparatus 1 in response to the input of the parameter information indicating the parameter variable Z of 3 from the number of times of outputs from the information processing apparatus 1 in response to the input of the parameter information indicating the parameter variable Z of 8. Accordingly, the researcher acquires the number of times of outputs from the information processing apparatus 1 as the number of times of cache misses that occur while the value of the third loop variable k changes from 3 to 7.

Accordingly, the information processing apparatus 1 in the embodiment specifies a specific array corresponding to a specific position based on the array information 136 and the specific positional information 133 and, for each position on the source code corresponding to the specific array, acquires information corresponding to the specific array from the array information 136.

The information processing apparatus 1 generates a hit condition expression for each position on the source code corresponding to the specific array based on the acquired information corresponding to the specific array, the specific positional information 133, the loop information 135, the data information 132, and the cache information 134. In addition, the information processing apparatus 1, for each position on the source code corresponding to the specific array, generates a hit source candidate expression based on the generated hit condition expression. Furthermore, the information processing apparatus 1 generates a hit source expression by excluding duplicates of candidates of an access indicated by each generated hit source candidate expression.

Next, the information processing apparatus 1 generates a variable range expression from a loop variable relevant to a loop surrounding a position on the source code corresponding to the specific array and from a parameter variable corresponding to the loop variable. The information processing apparatus 1 generates a first expression of number of times from the generated variable range expression, information specifying a loop variable included in the variable range expression, and information specifying a parameter variable included in the variable range expression. Furthermore, the information processing apparatus 1 generates a second expression of number of times from the hit source expression, information specifying a loop variable included in the hit source expression, and information specifying a parameter variable included in the hit source expression.

Then, the information processing apparatus 1 generates a conflict miss cause candidate expression for each position on the source code based on the hit source expression, the specific positional information 133, the loop information 135, the data information 132, and the cache information 134. The information processing apparatus 1 generates a conflict miss cause expression for each position on the source code by excluding duplicates of accesses indicated by each generated conflict miss cause candidate expression. Furthermore, the information processing apparatus 1 generates a third expression of number of times for each position on the source code from the generated conflict miss cause expression, information specifying a loop variable included in the conflict miss cause expression, and information specifying a parameter variable included in the conflict miss cause expression.

Next, the information processing apparatus 1 splits each conflict miss cause expression into conflict miss cause split expressions for each conflict miss cause expression based on the associativity of a cache. The information processing apparatus 1 specifies a combination of conflict miss cause split expressions for which the total of the number of types of conflict miss cause split expressions corresponding to each conflict miss cause expression resides below the associativity, and generates a conflict miss cause common expression for each conflict miss cause expression. Furthermore, the information processing apparatus 1 generates a fourth expression of number of times from the generated conflict miss cause common expression, information specifying a loop variable included in the conflict miss cause common expression, and information specifying a parameter variable included in the conflict miss cause common expression.

Then, the information processing apparatus 1 generates a first expression that is generated by subtracting the second expression of number of times from the first expression of number of times and a second expression that is generated by subtracting the fourth expression of number of times from the third expression of number of times.

Accordingly, the information processing apparatus 1 may calculate the number of times of cache misses without executing a program in a real machine or a simulator. Thus, the information processing apparatus 1 may efficiently calculate the number of times of cache misses.

In addition, the information processing apparatus 1 may specify a position of an access causing a cache miss on the source code without executing a program in a real machine or a simulator. Furthermore, the information processing apparatus 1 may specify the cause of an occurring cache miss without executing a program in a real machine or a simulator.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable and non-transitory storage medium storing a cache miss estimation program that causes a computer to execute a process comprising:

specifying a specific array corresponding to a specific position, based on array information and specific positional information, the array information including a position on source code of a program, information indicating a loop variable relevant to a loop surrounding the position, and information specifying an element of an array in the position, the specific positional information indicating the specific position on the source code, acquiring information corresponding to the specific array from the array information for each position on the source code corresponding to the specific array;

generating a hit condition expression for each position on the source code corresponding to the specific array, the hit condition expression calculating a condition for data of an access target being stored in a cache by an access in the specific array in a case of an access in the specific position, based on the acquired information corresponding to the specific array, the specific positional information, loop information including the loop variable and a parameter variable indicating a number of times of loops corresponding to the loop variable, data information including a size and an address in a memory allocated to each array in the source code, and cache information including an associativity of the cache in a CPU executing the program;

generating, based on the generated hit condition expression, a hit source candidate expression for each position on the source code corresponding to the specific array, the hit source candidate expression indicating a candidate of a lastly made access of accesses storing data in the cache;

generating a hit source expression that indicates the lastly made access of the accesses storing data in the cache by excluding duplicates of the candidates of the accesses indicated by each generated hit source candidate expression;

generating a variable range expression from the loop variable relevant to the loop surrounding the position on the source code corresponding to the specific array and from the parameter variable corresponding to the loop variable, the variable range expression indicating the range of a possible value of the loop variable relevant to the loop surrounding the position on the source code corresponding to the specific array;

generating a first expression of number of times from the generated variable range expression, information specifying the loop variable included in the variable range expression, and information specifying the parameter variable included in the variable range expression, the first expression of number of times indicating the number of times the specific position is executed;

generating a second expression of number of times from the hit source expression, information specifying the loop variable included in the hit source expression, and information specifying the parameter variable included in the hit source expression, the second expression of number of times indicating the number of times the data of the access target is stored in the cache in a case of execution of the specific position;

generating a conflict miss cause candidate expression for each position on the source code, based on the hit source expression, the specific positional information, the loop information, the data information, and the cache information, the conflict miss cause candidate expression indicating a candidate of an access causing the data of the access target in the specific position to be removed from the cache;

generating a conflict miss cause expression for each position on the source code by excluding duplicates of the accesses indicated by each generated conflict miss cause candidate expression, the conflict miss cause expression indicating an access causing the data of the access target in the specific position to be removed from the cache;

generating a third expression of number of times for each position on the source code by excluding duplicates of the accesses indicated by each generated conflict miss cause expression, from the conflict miss cause expression in which duplicates are excluded, information specifying the loop variable included in the conflict miss cause expression in which duplicates are excluded, and information specifying the parameter variable included in the conflict miss cause expression in which duplicates are excluded, the third expression of number of times indicating the number of times the data of the access target is removed from the cache in the case of execution of the specific position;

splitting, based on the associativity of the cache, the conflict miss cause expression for each conflict miss cause expression into conflict miss cause split expressions that correspond to accesses for each number of types of data stored in the cache after the data of the access target in the specific position is stored in the cache;

specifying a combination of the conflict miss cause split expressions for which the total of the number of types of the conflict miss cause split expressions corresponding to each conflict miss cause expression resides below the associativity, and generating, for each conflict miss cause expression, a conflict miss cause common expression that corresponds to a common access in the accesses indicated by each conflict miss cause split expression included in the specified combination;

generating a fourth expression of number of times from the generated conflict miss cause common expression, information specifying the loop variable included in the conflict miss cause common expression, and information specifying the parameter variable included in the conflict miss cause common expression, the fourth expression of number of times indicating the number of times the data of the access target is stored in the cache in the case of execution of the specific position;

generating an expression obtained by subtracting the second expression of number of times from the first expression of number of times and an expression obtained by subtracting the fourth expression of number of times from the third expression of number of times; and determining a number of times of cache misses based on the generated expression obtained by subtracting the second expression of number of times from the first expression of number of times and based on the generated expression obtained by subtracting the fourth expression of number of times from the third expression of number of times.

2. The storage medium storing the cache miss estimation program according to claim 1, wherein in the generating the hit condition expression, a program that generates an expression indicating a set of states of the cache is executed by the computer with input of information corresponding to the specific array, the specific positional information, the loop information, the data information, and the cache information, and an expression that is generated by the execution of the program generating the expression indicating the set of states of the cache is generated as the hit condition expression.

3. The storage medium storing the cache miss estimation program according to claim 1, wherein in the generating the hit source candidate expression, a program that generates an expression indicating the maximum value of a lexicographical order of the loop variable is executed by the computer with input of the hit condition expression, information specifying the loop variable included in the hit condition expression, and information specifying the parameter variable included in the hit condition expression, and an expression that is generated by the execution of the program generating the expression indicating the maximum value of the lexicographical order of the loop variable is generated as the hit source candidate expression.

4. The storage medium storing the cache miss estimation program according to claim 3,
wherein the program that generates the expression indicating the maximum value of the lexicographical order of the loop variable is a program that uses parametric integer programming.

5. The storage medium storing the cache miss estimation program according to claim 1,
wherein in the generating the hit source expression, a program that excludes duplicates of ranges indicated by each of a plurality of expressions is executed by the computer with input of the hit source candidate expression, and
an expression that is generated by the execution of the program excluding duplicates of the ranges indicated by each of the plurality of expressions is generated as the hit source expression.

6. The storage medium storing the cache miss estimation program according to claim 1,
wherein in the generating the first expression of number of times,
a program that generates the variable range expression is executed by the computer with input of the loop variable corresponding to the specific array and the parameter variable corresponding to the loop variable corresponding to the specific array,
an expression that is generated by the program generating the variable range expression is generated as the variable range expression,
a program that generates an expression indicating the number of combinations of possible values of the loop variable is executed by the computer with input of the variable range expression, information specifying the loop variable included in the variable range expression, and information specifying the parameter variable included in the variable range expression, and
an expression that is generated by the execution of the program generating the expression indicating the number of combinations of the possible values of the loop variable is generated as the first expression of number of times.

7. The storage medium storing the cache miss estimation program according to claim 6,
wherein the program that generates the expression indicating the number of combinations of the possible values of the loop variable is a program that uses a parametric discrete volume calculation technique.

8. The storage medium storing the cache miss estimation program according to claim 1,
wherein in the generating the second expression of number of times, a program that generates an expression indicating the number of combinations of possible values of the loop variable is executed by the computer with input of the hit source expression, information specifying the loop variable included in the hit source expression, and information specifying the parameter variable included in the hit source expression, and
an expression that is generated by the execution of the program generating the expression indicating the number of combinations of the possible values of the loop variable is generated as the second expression of number of times.

9. The storage medium storing the cache miss estimation program according to claim 1,
wherein in the generating the conflict miss cause candidate expression, a program that generates an expression indicating a set of states of the cache is executed by the computer with input of the hit source expression, the specific positional information, the loop information, the data information, and the cache information, and
an expression that is generated by the execution of the program generating the expression indicating the set of states of the cache is generated as the conflict miss cause candidate expression.

10. The storage medium storing the cache miss estimation program according to claim 1,
wherein in the generating the conflict miss cause expression,
the loop variable that represents an access causing the data of the access target in the specific array to be removed from the cache is removed from the conflict miss cause candidate expression to generate the conflict miss cause candidate expression from which the loop variable is removed,
the conflict miss cause candidate expression in which duplicates are excluded is generated by excluding duplicates of the accesses indicated by each conflict miss cause candidate expression from which the loop variable is removed, and
an identification variable that identifies the data of the access target is removed from the conflict miss cause candidate expression in which duplicates are excluded to generate the conflict miss cause expression.

11. The storage medium storing the cache miss estimation program according to claim 1,
wherein in the generating the conflict miss cause expression,
a program that removes a variable included in an expression is executed by the computer with input of the conflict miss cause candidate expression and information specifying the loop variable that represents an access causing the data of the access target in the specific array to be removed from the cache,
an expression from which the loop variable is removed by the execution of the program removing the variable included in the expression is generated as the conflict miss cause candidate expression from which the loop variable is removed,
a program that excludes duplicates of ranges indicated by each of a plurality of expressions is executed by the computer with input of the conflict miss cause candidate expression from which the loop variable is removed,
an expression that is generated by the execution of the program excluding duplicates of the ranges indicated by each of the plurality of expressions is generated as the conflict miss cause candidate expression in which duplicates are excluded,
the program that removes a variable included in an expression is executed by the computer with input of the conflict miss cause candidate expression in which duplicates are excluded and information specifying an identification variable identifying the data of the access target, and
an expression from which the identification variable is removed by the execution of the program removing the variable included in the expression is generated as the conflict miss cause expression.

12. The storage medium storing the cache miss estimation program according to claim 1,
wherein in the generating the third expression of number of times,
the conflict miss cause expression after exclusion of duplicates is generated by excluding duplicates of the accesses indicated by each conflict miss cause expression, and
an expression that indicates the number of combinations of possible values of the loop variable included in the conflict miss cause expression after exclusion of duplicates is generated as the third expression of number of times from the conflict miss cause expression after exclusion of duplicates.

13. The storage medium storing the cache miss estimation program according to claim 1,
wherein in the generating the third expression of number of times,
a program that excludes duplicates of ranges indicated by each of a plurality of expressions is executed by the computer with input of the conflict miss cause expression,
an expression that is generated by the execution of the program excluding duplicates of the ranges indicated by each of the plurality of expressions is generated as the conflict miss cause expression after exclusion of duplicates,
a program that generates an expression indicating the number of combinations of possible values of the loop variable is executed by the computer with input of the conflict miss cause expression after exclusion of duplicates, information specifying the loop variable included in the conflict miss cause expression after exclusion of duplicates, and information specifying the parameter variable included in the conflict miss cause expression after exclusion of duplicates, and
an expression that is generated by the execution of the program generating the expression indicating the number of combinations of the possible values of the loop variable is generated as the third expression of number of times.

14. The storage medium storing the cache miss estimation program according to claim 1,
wherein in the generating the conflict miss cause split expression,
for each number of types of the data, the conflict miss cause expression is classified as a first expression including an identification variable identifying the data of the access target or as a second expression not including the identification variable, and the classified first expression is duplicated in the same number as the number of types of the data,
for each number of types of the data, the identification variable included in each duplicated first expression is changed to a different identification variable for each duplicated first expression,
for each number of types of the data, an expression from which each changed identification variable is removed is generated as a third expression from each first expression in which the identification variable is changed, the second expression, and an expression that indicates a relationship in magnitude between respective changed identification variables, and
for each number of types of the data, the difference between a range indicated by the third expression corresponding to the number of each type of data and a range indicated by the third expression corresponding to a number greater by 1 than the number of each type of data is generated as the conflict cause split expression corresponding to the number of each type of data.

15. The storage medium storing the cache miss estimation program according to claim 14,
wherein in the generation of the third expression,
for each number of types of the data, a program that removes a variable included in an expression is executed by the computer with input of each first expression in which the identification variable is changed, the second expression, the expression indicating the relationship in magnitude between respective changed identification variables, and information specifying each changed identification variable,
an expression that is generated by the execution of the program removing the variable included in the expression is generated as the third expression, and
in the generation of the conflict cause split expression,
for each number of types of data, a program that generates an expression indicating the difference between ranges indicated by each of a plurality of expressions is executed by the computer with input of the third expression corresponding to the number of each type of data and the third expression corresponding to the number greater by 1 than the number of each type of data, and
for each number of types of the data, an expression that is generated by the execution of the program generating the expression indicating the difference between the ranges indicated by each of the plurality of expressions is generated as the conflict cause split expression corresponding to the number of each type of data.

16. The storage medium storing the cache miss estimation program according to claim 1,
wherein in the generating the conflict miss cause common expression, a program that generates an expression indicating a common part of ranges indicated by each of a plurality of expressions is executed by the computer with input of each conflict miss cause split expression included in the combination, and
an expression that is generated by the program generating the expression indicating the common part of the ranges indicated by each of the plurality of expressions is generated as the conflict miss cause common expression.

17. The storage medium storing the cache miss estimation program according to claim 1,
wherein in the generating the fourth expression of number of times, a program that generates an expression indicating the number of combinations of possible values of the loop variable is executed by the computer with input of the conflict miss cause common expression, information specifying the loop variable included in the conflict miss cause common expression, and information specifying the parameter variable included in the conflict miss cause common expression, and
an expression that is generated by the execution of the program generating the expression indicating the number of combinations of the possible values of the loop variable is generated as the fourth expression of number of times.

18. The storage medium storing the cache miss estimation program according to claim 1 that causes the computer to execute the process further comprising:
receiving a value that corresponds to the parameter variable; and calculating the total of a value calculated by substituting the received value corresponding to the parameter variable in an expression generated by subtracting the second expression of number of times from the first expression of number of times and a value calculated by substituting the received value corresponding to the parameter variable in an expression generated by subtracting the fourth expression of number of times from the third expression of number of times.

19. An information processing apparatus comprising:
a memory; and
a processor coupled to the memory and configured to executes processes including:
a first expression generation process of:
specifying a specific array corresponding to a specific position, based on array information and specific positional information, the array information including a position on source code of a program, information indicating a loop variable relevant to a loop surrounding the position, and information specifying an element of an array in the position, the specific positional information indicating the specific position on the source code,
acquiring information corresponding to the specific array from the array information for each position on the source code corresponding to the specific array,
generating a hit condition expression for each position on the source code corresponding to the specific array, the hit condition expression calculating a condition for data of an access target being stored in a cache by an access in the specific array in a case of an access in the specific position, based on the acquired information corresponding to the specific array, the specific positional information, loop information including the loop variable and a parameter variable indicating the number of times of loops corresponding to the loop variable, data information including a size and an address in a memory allocated to each array in the source code, and cache information including an associativity of the cache in a CPU executing the program,
generating, based on the generated hit condition expression, a hit source candidate expression for each position on the source code corresponding to the specific array, the hit source candidate expression indicating a candidate of a lastly made access of accesses storing data in the cache,
generating a hit source expression that indicates the lastly made access of the accesses storing data in the cache by excluding duplicates of the candidates of the accesses indicated by each generated hit source candidate expression,
generating a variable range expression from the loop variable relevant to the loop surrounding the position on the source code corresponding to the specific array and from the parameter variable corresponding to the loop variable, the variable range expression indicating the range of a possible value of the loop variable relevant to the loop surrounding the position on the source code corresponding to the specific array,
generating a first expression of number of times from the generated variable range expression, information specifying the loop variable included in the variable range expression, and information specifying the parameter variable included in the variable range expression, the first expression of number of times indicating the number of times the specific position is executed, and generating a second expression of number of times from the hit source expression, information specifying the loop variable included in the hit source expression, and information specifying the parameter variable included in the hit source expression, the second expression of number of times indicating the number of times the data of the access target is stored in the cache in a case of execution of the specific position;
a second expression generation process of:
generating a conflict miss cause candidate expression for each position on the source code, based on the hit source expression, the specific positional information, the loop information, the data information, and the cache information, the conflict miss cause candidate expression indicating a candidate of an access causing the data of the access target in the specific position to be removed from the cache,
generating a conflict miss cause expression for each position on the source code by excluding duplicates of the accesses indicated by each generated conflict miss cause candidate expression, the conflict miss cause expression indicating an access causing the data of the access target in the specific position to be removed from the cache,
generating a third expression of number of times for each position on the source code by excluding duplicates of the accesses indicated by each generated conflict miss cause expression, from the conflict miss cause expression in which duplicates are excluded, information specifying the loop variable included in the conflict miss cause expression in which duplicates are excluded, and information specifying the parameter variable included in the conflict miss cause expression in which duplicates are excluded, the third expression of number of times indicating the number of times the data of the access target is removed from the cache in the case of execution of the specific position,
splitting, based on the associativity of the cache, the conflict miss cause expression for each conflict miss cause expression into conflict miss cause split expressions that correspond to accesses for each number of types of data stored in the cache after the data of the access target in the specific position is stored in the cache,
specifying a combination of the conflict miss cause split expressions for which the total of the number of types of the conflict miss cause split expressions corresponding to each conflict miss cause expression resides below the associativity, and generating, for each conflict miss cause expression, a conflict miss cause common expression that corresponds to a common access in the accesses indicated by each conflict miss cause split expression included in the specified combination, and
generating a fourth expression of number of times from the generated conflict miss cause common expression, information specifying the loop variable included in the conflict miss cause common expression, and information specifying the parameter variable included in the conflict miss cause common expression, the fourth expression of number of times indicating the number of times the data of the access target is stored in the cache in the case of execution of the specific position; and
a third expression generation process of generating an expression generated by subtracting the second expression of number of times from the first expression of number of times and an expression generated by subtracting the fourth expression of number of times from the third expression of number of times, and determining a number of times of cache misses based on the generated expression generated by subtracting the second expression of number of times from the first expression of number of times and based on the generated expression generated by subtracting the fourth expression of number of times from the third expression of number of times.

20. A cache miss estimation method comprising:

specifying a specific array corresponding to a specific position, based on array information and specific positional information, the array information including a position on source code of a program, information indicating a loop variable relevant to a loop surrounding the position, and information specifying an element of an array in the position, the specific positional information indicating the specific position on the source code, acquiring information corresponding to the specific array from the array information for each position on the source code corresponding to the specific array;

generating a hit condition expression for each position on the source code corresponding to the specific array, the hit condition expression calculating a condition for data of an access target being stored in a cache by an access in the specific array in a case of an access in the specific position, based on the acquired information corresponding to the specific array, the specific positional information, loop information including the loop variable and a parameter variable indicating the number of times of loops corresponding to the loop variable, data information including a size and an address in a memory allocated to each array in the source code, and cache information including an associativity of the cache in a CPU executing the program;

generating, based on the generated hit condition expression, a hit source candidate expression for each position on the source code corresponding to the specific array, the hit source candidate expression indicating a candidate of a lastly made access of accesses storing data in the cache;

generating a hit source expression that indicates the lastly made access of the accesses storing data in the cache by excluding duplicates of the candidates of the accesses indicated by each generated hit source candidate expression;

generating a variable range expression from the loop variable relevant to the loop surrounding the position on the source code corresponding to the specific array and from the parameter variable corresponding to the loop variable, the variable range expression indicating the range of a possible value of the loop variable relevant to the loop surrounding the position on the source code corresponding to the specific array;

generating a first expression of number of times from the generated variable range expression, information specifying the loop variable included in the variable range expression, and information specifying the parameter variable included in the variable range expression, the first expression of number of times indicating the number of times the specific position is executed;

generating a second expression of number of times from the hit source expression, information specifying the loop variable included in the hit source expression, and information specifying the parameter variable included in the hit source expression, the second expression of number of times indicating the number of times the data of the access target is stored in the cache in a case of execution of the specific position;

generating a conflict miss cause candidate expression for each position on the source code, based on the hit source expression, the specific positional information, the loop information, the data information, and the cache information, the conflict miss cause candidate expression indicating a candidate of an access causing the data of the access target in the specific position to be removed from the cache;

generating a conflict miss cause expression for each position on the source code by excluding duplicates of the accesses indicated by each generated conflict miss cause candidate expression, the conflict miss cause expression indicating an access causing the data of the access target in the specific position to be removed from the cache;

generating a third expression of number of times for each position on the source code by excluding duplicates of the accesses indicated by each generated conflict miss cause expression, from the conflict miss cause expression in which duplicates are excluded, information specifying the loop variable included in the conflict miss cause expression in which duplicates are excluded, and information specifying the parameter variable included in the conflict miss cause expression in which duplicates are excluded, the third expression of number of times indicating the number of times the data of the access target is removed from the cache in the case of execution of the specific position;

splitting, based on the associativity of the cache, the conflict miss cause expression for each conflict miss cause expression into conflict miss cause split expressions that correspond to accesses for each number of types of data stored in the cache after the data of the access target in the specific position is stored in the cache;

specifying a combination of the conflict miss cause split expressions for which the total of the number of types of the conflict miss cause split expressions corresponding to each conflict miss cause expression resides below the associativity, and generating, for each conflict miss cause expression, a conflict miss cause common expression that corresponds to a common access in the accesses indicated by each conflict miss cause split expression included in the specified combination;

generating a fourth expression of number of times from the generated conflict miss cause common expression, information specifying the loop variable included in the conflict miss cause common expression, and information specifying the parameter variable included in the conflict miss cause common expression, the fourth expression of number of times indicating the number of times the data of the access target is stored in the cache in the case of execution of the specific position; and generating an expression generated by subtracting the second expression of number of times from the first expression of number of times and an expression generated by subtracting the fourth expression of number of times from the third expression of number of times, determining a number of times of cache misses based on the generated expression generated by subtracting the second expression of number of times from the first expression of number of times and based on the generated expression generated by subtracting the fourth expression of number of times from the third expression of number of times.

* * * * *